(12) United States Patent
Hwang

(10) Patent No.: US 12,379,964 B2
(45) Date of Patent: Aug. 5, 2025

(54) SYSTEM FOR ARTIFICIAL INTELLIGENCE AGENT AND METHOD OF OPERATION OF THE SYSTEM

(71) Applicant: Piamond Corp., Busan (KR)

(72) Inventor: Doo Geon Hwang, Busan (KR)

(73) Assignee: PIAMOND CORP., Busan (KR)

( * ) Notice: Subject to any disclaimer, the term of this patent is extended or adjusted under 35 U.S.C. 154(b) by 0 days.

(21) Appl. No.: 18/950,323

(22) Filed: Nov. 18, 2024

(65) Prior Publication Data

US 2025/0165296 A1 May 22, 2025

(30) Foreign Application Priority Data

| Nov. 16, 2023 | (KR) | 10-2023-0158849 |
| Nov. 11, 2024 | (KR) | 10-2024-0159364 |
| Nov. 11, 2024 | (KR) | 10-2024-0159365 |
| Nov. 11, 2024 | (KR) | 10-2024-0159366 |

(51) Int. Cl.

| G06F 9/50 | (2006.01) |
| G06F 21/53 | (2013.01) |
| G06F 40/30 | (2020.01) |
| H04L 9/32 | (2006.01) |

(52) U.S. Cl.
CPC ............ G06F 9/5027 (2013.01); G06F 21/53 (2013.01); G06F 40/30 (2020.01); H04L 9/32 (2013.01)

(58) Field of Classification Search
CPC ......... G06F 9/5027; G06F 21/53; G06F 40/30
See application file for complete search history.

(56) References Cited

U.S. PATENT DOCUMENTS

| 11,182,203 | B2 * | 11/2021 | Delcheva | H04L 41/344 |
| 12,086,219 | B2 * | 9/2024 | Hwang | G06F 21/316 |
| 12,086,630 | B2 * | 9/2024 | Hwang | G06F 9/4868 |
| 2009/0198651 | A1 * | 8/2009 | Shiffer | G06F 16/00 |
| 2009/0199274 | A1 * | 8/2009 | Frazier | H04L 63/08 |
| | | | | 726/4 |
| 2014/0316776 | A1 * | 10/2014 | Lee | G10L 15/22 |
| | | | | 704/231 |
| 2017/0140759 | A1 * | 5/2017 | Kumar | G10L 15/30 |
| 2018/0157550 | A1 * | 6/2018 | Ivanov | H04L 41/122 |
| 2018/0276508 | A1 * | 9/2018 | Crabtree | G06Q 10/063112 |
| 2020/0342292 | A1 * | 10/2020 | Cheng | G06F 17/15 |
| 2021/0117231 | A1 * | 4/2021 | Pan | G06F 9/4862 |
| 2021/0319281 | A1 * | 10/2021 | Ji | H04L 67/10 |
| 2022/0171818 | A1 * | 6/2022 | Gregori | G06F 16/35 |
| 2023/0305896 | A1 * | 9/2023 | Wood | H04L 9/0894 |
| 2023/0319585 | A1 * | 10/2023 | Zhang | G06N 20/00 |
| | | | | 706/12 |

(Continued)

*Primary Examiner* — Benjamin C Wu
(74) *Attorney, Agent, or Firm* — ArentFox Schiff LLP; Joseph M. Maraia; Marlo Schepper Grolnic

(57) ABSTRACT

Disclosed are a system for an artificial intelligence agent and an operating method thereof. An operating method of a mobile-centric agent hub system (MCAHS) may include registering and authenticating AI agents included in an external device, determining a task by analyzing an instruction received from a user, selecting an AI agent for processing the determined task, among the registered AI agents, transmitting the determined task to the selected AI agent, receiving the results of processing of the transferred task from the selected AI agent, and providing a final response generated based on the received results of the processing to the user.

9 Claims, 19 Drawing Sheets

(56) References Cited

U.S. PATENT DOCUMENTS

| | | | |
|---|---|---|---|
| 2023/0394413 A1* | 12/2023 | Das | G06N 3/0475 |
| 2024/0020143 A1* | 1/2024 | Shtarbev | G06F 21/1064 |
| 2024/0020357 A1* | 1/2024 | Shtarbev | G06F 21/121 |
| 2024/0248833 A1* | 7/2024 | Gupta | G06F 11/0709 |
| 2024/0314592 A1* | 9/2024 | Wang | H04W 24/02 |
| 2025/0061307 A1* | 2/2025 | Tran | G06N 3/045 |

* cited by examiner

SYSTEM FOR ARTIFICIAL INTELLIGENCE AGENT AND METHOD OF OPERATION OF THE SYSTEM

CROSS-REFERENCE TO RELATED APPLICATION

This application is based on and claims priority under 35 U.S.C. 119 to Korean Patent Application No. 10-2023-0158849, filed on Nov. 16, 2023 and Korean Patent Application Nos. 10-2024-0159364, 10-2024-0159365, and 10-2024-0159366, filed on Nov. 11, 2024 in the Korean intellectual property office, the disclosures of which are herein incorporated by reference in their entireties.

TECHNICAL FIELD

The following description relates to a system for an artificial intelligence (AI) agent and an operating method thereof.

BACKGROUND OF THE DISCLOSURE

In various user terminals and service environments, the utilization of a user-customized artificial intelligence (AI) model is increased. If AI models for users operate in various devices, information synchronization between the AI models is essential for the consistency of user services. Furthermore, in various service use environments for users, if AI models are synchronized with respect to user-customized information, it may be effective in terms of continuity between the services.

Furthermore, if some of AI models that operate in various user terminals, for example, a personal computer (PC), a laptop, a tablet, a smart car or connected car, and an Internet of Things (IoT) device, are AI models by the same supplier, information of user-customized AI models needs to be synchronized in a safe and reliable way. For example, information of a user AI model that is updated through the use of a smart speaker or smart TV in a user's house needs to be synchronized with an AI model of a user vehicle when the user uses the user vehicle in order to go to work or move.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments provide a mobile-centric agent hub system (MCAHS) for an AI agent, which operates in an external device, and an operating method thereof.

Embodiments provide the MCAHS including a safe execution environment and an operating method thereof.

Embodiments provide an AI agent system based on cloud, which uses multiple AI agents in a cloud environment, and an operating method thereof.

An operating method of a mobile-centric agent hub system (MCAHS) implemented with a computer device including at least one processor includes registering and authenticating, by the at least one processor, AI agents included in an external device, determining, by the at least one processor, a task by analyzing an instruction received from a user, selecting, by the at least one processor, an AI agent for processing the determined task, among the registered AI agents, transmitting, by the at least one processor, the determined task to the selected AI agent, receiving, by the at least one processor, the results of processing of the transferred task from the selected AI agent, and providing, by the at least one processor, a final response generated based on the received results of the processing to the user.

According to an aspect, the determining of the task may include determining a plurality of tasks for the processing of the instruction. The selecting of the AI agent may include selecting a plurality of AI agents for processing the plurality of tasks.

According to another aspect, the receiving of the results of the processing may include receiving a plurality of processing results from the plurality of AI agents. The providing of the final response to the user may include generating the final response based on integrated results of the plurality of processing results and providing the final response to the user.

According to still another aspect, the selecting of the AI agent may include selecting a plurality of AI agents for processing the determined task. The receiving of the results of the processing may include receiving a plurality of processing results from the plurality of AI agents. The providing of the final response to the user may include selecting one of the plurality of processing results, generating a final response based on the selected processing result, and providing the final response to the user.

According to still another aspect, the operating method of the MCAHS may further include monitoring, by the at least one processor, a state of the registered AI agent. The selecting of the AI agent may include selecting an AI agent for processing the determined task based on the monitored state of the AI agent.

According to still another aspect, the registering and authenticating of the AI agent may include issuing an authentication token by identifying an identity of the AI agent of the external device that requests a connection through an application programming interface (API) gateway included in the MCAHS, validating a service that is providable by the AI agent of the external device by receiving service specifications including detailed information of the service and the authentication token, registering the service with a service catalog when the validation of the service is completed and setting access rights and a security policy for the registered service, and transmitting a registration completion message including a unique identifier of the service and an access token to the AI agent of the external device.

According to still another aspect, the service specifications may include information on at least one of the name of the service, the unique identifier of the service, the category of the service, a list of functions supported by the service, a description of the functions, the format of an input parameter of the service, the format of a return value of the service, the quality index of the service, rights and an access level required for the service, the version of the service, and the update history of the service.

According to still another aspect, the selecting of the AI agent may include generating a list of AI agents corresponding to a service area of the task, aligning the list of AI agents based on preset priority, and selecting a preset number of AI agents from a highest priority of the list.

According to still another aspect, the static priority may include at least one of basic priority that is set based on user preference and priority according to a service quality index. The dynamic priority may include at least one of priority based on the results of real-time performance monitoring, priority based on an analysis of a recent use pattern of the user for an AI agent, and adaptive priority that is set based on context. The preset priority may include static priority and dynamic priority.

According to still another aspect, the computer device may include a mobile device of the user. The operating method of the MCAHS may be performed by the at least one processor under a control of an AI agent that is provided by an operating platform supplier of the mobile device.

According to still another aspect, the determining of the task may include determining the intent of the instruction, determining a domain of the instruction, analyzing context associated with the instruction, generating a feature vector based on the determined intent, the determined domain, and information extracted from the determined context, predicting the type of instruction by inputting the generated feature vector to a pre-trained machine learning model, and determining the task based on synthesized results of the determined intent, the determined domain, the determined context, and the predicted type.

According to still another aspect, the determining of the task based on the synthesized results may include calculating a confidence score of the synthesized results, comparing the confidence score with a preset threshold, and requesting the user to check the determined task when the confidence score is less than the threshold.

In an operating method of a mobile-centric agent hub system (MCAHS) implemented with a computer device including at least one processor, the computer device may include a trusted AI agent operation environment in an operating system. The operating method may include managing, by the at least one processor, information on an application installed in the MCAHS in accordance with an AI agent, determining, by the at least one processor, a task by analyzing an instruction received from a user and selecting an AI agent for processing the determined task, generating, by the at least one processor, an execution container for executing the determined task through the trusted AI agent operation environment, executing, by the at least one processor, an application of the selected AI agent by loading the application onto the generated execution container and executing the determined task through the selected AI agent by allocating the determined task to the generated execution container, receiving, by the at least one processor, processing the results of the executed task from the execution container, and providing, by the at least one processor, a final response generated based on the received results of the processing to the user.

According to an aspect, the trusted AI agent operation environment may include a resource monitoring module configured to monitor and limit a resource use of an AI agent and an execution policy management module configured to manage a policy to control a behavior and access rights of the AI agent. The execution container in which the AI agent is executed in an isolated environment may be generated.

According to another aspect, the selecting of the AI agent may include determining a plurality of tasks for processing the instruction and selecting a plurality of AI agents for processing the plurality of tasks.

According to still another aspect, the generating of the execution container may include generating a plurality of execution containers for the plurality of AI agents. The executing of the determined task may include processing a corresponding task, among the plurality of tasks, through an application of an AI agent loaded onto the execution container by transmitting the corresponding task to each of the plurality of execution containers.

According to still another aspect, the receiving of the results of the processing may include receiving a plurality of processing results from the plurality of execution containers. The providing of the final response to the user may include generating the final response based on integrated results of the plurality of processing results and providing the final response to the user.

According to still another aspect, the computer device may include a mobile device of the user. The operating method of the MCAHS may be performed by the at least one processor under a control of an AI agent that is provided by an operating platform supplier of the mobile device.

According to still another aspect, the managing of the information on the application may include synchronizing the installed application and information of an AI agent corresponding to the installed application with an app store.

According to still another aspect, the selecting of the AI agent may include selecting the AI agent for processing the determined task by considering at least one of a function or service executable by the AI agent, a past use pattern of the user for the AI agent, preference of the user, whether to operate in conjunction with a payment system into which a task that requires payment has been incorporated, information on the location of the user, and an advertising association possibility.

In an operating method of an AI agent system based on the cloud, the AI agent system based on the cloud includes a user terminal and a cloud system. The operating method of the AI agent system based on the cloud may include receiving, by the user terminal, an instruction from a user and transmitting the instruction to the cloud system, determining, by the cloud system, a task by analyzing the received instruction, selecting, by the cloud system, an AI agent for processing the determined task, processing, by the cloud system, the determined task through the selected AI agent and transmitting the results of the processing to the user terminal, and receiving, by the user terminal, the results of the processing of the instruction from the cloud system and providing a final response to the user. The selecting of the AI agent may include selecting the AI agent for processing the determined task, among AI agents including AI agents installed in the user terminal and AI agents included in the cloud system.

There is provided a computer-readable recording medium in which a computer program for executing the method in a computer device has been written.

In a mobile-centric agent hub system (MCAHS) implemented with a computer device including at least one processor, the at least one processor registers and authenticates AI agents included in an external device, determines a task by analyzing an instruction received from a user, selects an AI agent for processing the determined task, among the registered AI agents, transmits the determined task to the selected AI agent, receives the results of processing of the transferred task from the selected AI agent, and provides a final response generated based on the received results of the processing to the user.

In a mobile-centric agent hub system (MCAHS) implemented with a computer device including at least one processor, the computer device includes a trusted AI agent operation environment in an operating system. The at least one processor manages information on an application installed in the MCAHS in accordance with an AI agent, determines a task by analyzing an instruction received from a user, selects an AI agent for processing the determined task, generates an execution container for executing the determined task through the trusted AI agent operation environment, executes an application of the selected AI agent by loading the application onto the generated execution container, executes the determined task through the selected AI agent by allocating the task to the generated execution container, receives the processing results of the executed task from the execution container, and provides the user with a final response generated based on the received results of the processing.

An AI agent system based on a cloud includes a user terminal configured to receive an instruction of a user, transmit the instruction to a cloud system, receive the results of a processing of the instruction from the cloud system, and provide the results to the user, and the cloud system configured to determine a task by analyzing the received instruction, select an AI agent for processing the determined task, process the determined task through the selected AI agent, and transmit the results of the processing to the user terminal. The cloud system selects the AI agent for processing the determined task, among AI agents including AI agents installed in the user terminal and AI agents included in the cloud system.

According to an aspect, the user terminal may include a mobile operating system AI agent that is provided by a mobile operating system platform supplier. The mobile operating system AI agent may control the user terminal to receive the instruction of the user, transmit the instruction to the cloud system, receive the results of the processing of the instruction from the cloud system, and provide the results to the user.

According to another aspect, the user terminal may include a mobile AI agent manager that manages a list of the AI agents installed in the user terminal. The cloud system may identify the AI agents installed in the user terminal by obtaining the list of AI agents from the mobile AI agent manager.

According to still another aspect, the cloud system may include a cloud AI agent inference service configured to determine the task by analyzing the received instruction and select the AI agent for processing the determined task, and an AI agent execution engine configured to allocate the determined task to the selected AI agent, process the determined task through the selected AI agent, and transmit the results of the processing to the cloud AI agent inference service.

According to still another aspect, the AI agent execution engine may control the user terminal so that the AI agent installed in the user terminal processes the determined task in association with the user terminal when the selected AI agent is the AI agent installed in the user terminal.

According to still another aspect, the selected AI agent may include at least one AI agent selected among the AI agents installed in the user terminal and at least one AI agent selected among the AI agents included in the cloud system.

According to still another aspect, the cloud system may select the AI agent installed in the user terminal or the AI agent included in the cloud system by considering the complexity of the determined task.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, embodiments are described in detail with reference to the accompanying drawings.

Figure 1:
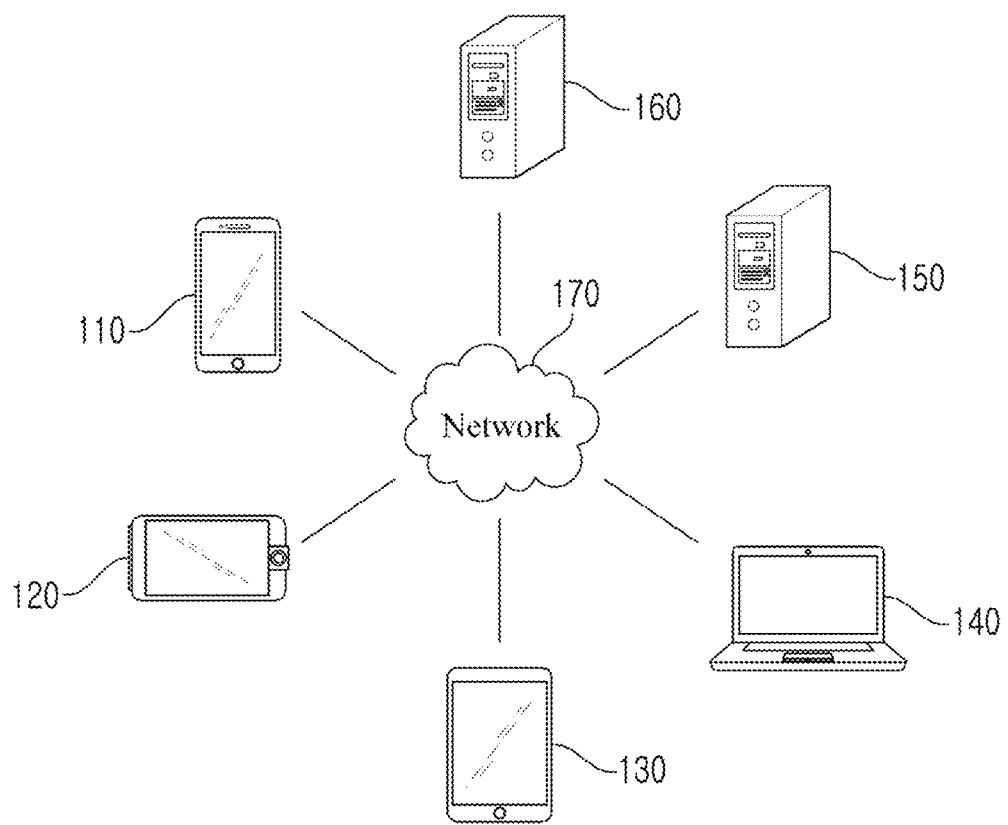
FIG. 1 is a diagram illustrating an example of a network environment according to an embodiment of the present disclosure.

FIG. 1 is a diagram illustrating an example of a network environment according to an embodiment of the present disclosure. FIG. 1 illustrates an example of the network environment including a plurality of electronic devices 110, 120, 130, and 140, a plurality of servers 150 and 160, and a network 170. FIG. 1 is an example for the description of the present disclosure, and the number of electronic devices or the number of servers is not limited to that illustrated in FIG. 1.

The plurality of electronic devices 110, 120, 130, and 140 may be a stationary terminal or a mobile terminal that is implemented with a computer system. The plurality of electronic devices 110, 120, 130, and 140 may each be a smartphone, a mobile phone, a navigation device, a computer, a laptop computer, a device for digital broadcasting, personal digital assistants (PDA), a portable multimedia player (PMP), a tablet PC, a game console, a wearable device, an Internet of things (IoT) device, a virtual reality (VR) device, an augmented reality (AR) device, for example. For example, FIG. 1 illustrates a shape of a smartphone as an example of the electronic device 110. However, in embodiments of the present disclosure, the electronic device 110 may refer to one of various physical computer systems capable of substantially communicating with other electronic devices 120, 130, and 140 and/or the servers 150 and 160 over the network 170 by using a wireless or wired communication method.

The communication method is not limited, and may include short-distance wired/wireless communication between devices, in addition to communication methods using communication networks (e.g., a mobile communication network, wired Internet, wireless Internet, a broadcasting network and a satellite network) which may be included in the network 170. For example, the network 170 may include one or more arbitrary networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but the present disclosure is not limited thereto.

Each of the servers 150 and 160 may be implemented with a computer device or a plurality of computer devices which provides an instruction, a code, a file, content, or a service through communication with the plurality of electronic devices 110, 120, 130, and 140 over the network 170. For example, the server 150 may be a system that provides a first service to the plurality of electronic devices 110, 120, 130, and 140 connected thereto over the network 170. The server 160 may be a system that provides a second service to the plurality of electronic devices 110, 120, 130, and 140 connected thereto over the network 170. As a more detailed example, the server 150 may provide the plurality of electronic devices 110, 120, 130, and 140 with a service (e.g., a search service) that is targeted by an application, as the first service, through the application as a computer program that is installed and operated in the plurality of electronic devices 110, 120, 130, and 140. As another example, the server 160 may provide a service that distributes a file for the installation and driving of the application to the plurality of electronic devices 110, 120, 130, and 140 as the second service.

Figure 2:
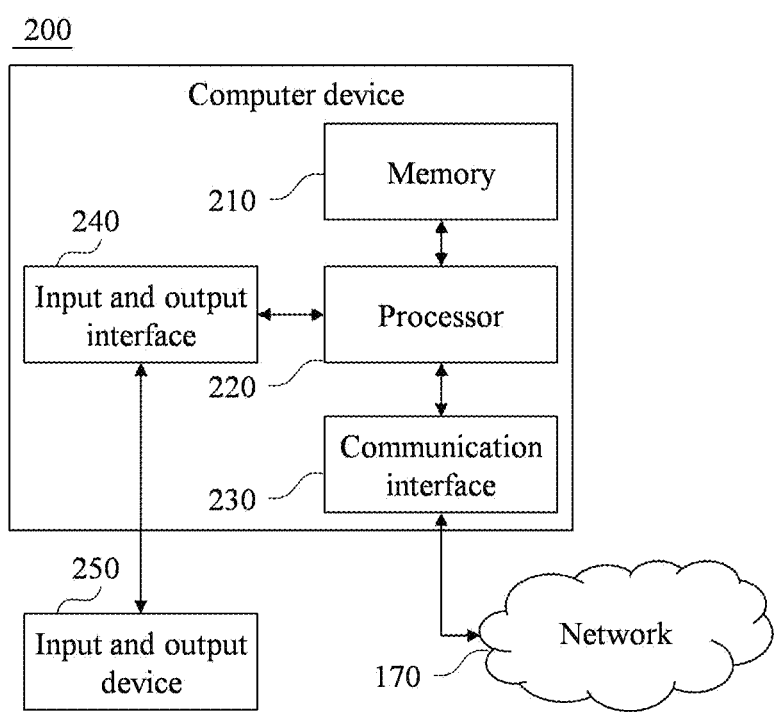
FIG. 2 is a block diagram illustrating an example of a computer device according to an embodiment of the present disclosure.

FIG. 2 is a block diagram illustrating an example of a computer device according to an embodiment of the present disclosure. Each of the plurality of electronic devices 110, 120, 130, and 140 or each of the servers 150 and 160 may be implemented with the computer device 200 illustrated in FIG. 2.

As illustrated in FIG. 2, the computer device 200 may include memory 210, a processor 220, a communication interface 230, and an input and output interface 240. The memory 210 is a computer-readable recording medium, and may include random access memory (RAM), read only memory (ROM), and permanent mass storage devices, such as a disk drive. In this case, ROM and permanent mass storage devices, such as a disk drive, is a separate permanent storage device that is different from the memory 210, and may be included in the computer device 200. Furthermore, an operating system and at least one program code may be stored in the memory 210. Such software components may be loaded from a computer-readable recording medium that is different from the memory 210 onto the memory 210. Such a separate computer-readable recording medium may include computer-readable recording media, such as a floppy drive, a disk, a tape, a DVD/CD-ROM drive, and a memory card. In another embodiment, the software components may be loaded onto the memory 210 through the communication interface 230 not a computer-readable recording medium. For example, the software components may be loaded onto the memory 210 of the computer device 200 based on a computer program that is installed by files that are received over a network 170.

The processor 220 may be configured to process an instruction of a computer program by performing basic arithmetic, logic, and input/output (I/O) operations. The instructions may be provided to the processor 220 by the memory 210 or the communication interface 230. For example, the processor 220 may be configured to execute received instructions based on a program code that has been stored in a recording device, such as the memory 210.

The communication interface 230 may provide a function for enabling the computer device 200 to communicate with other devices (e.g., the aforementioned storage devices) over the network 170. For example, a request, an instruction, data, or a file that is generated by the processor 220 of the computer device 200 based on a program code that has been stored in a recording device, such as the memory 210, may be transferred to other devices over the network 170 under the control of the communication interface 230. Inversely, a signal, an instruction, data, or a file from another device may be received by the computer device 200 through the communication interface 230 of the computer device 200 over the network 170. A signal, an instruction, a file that is received through the communication interface 230 may be transmitted to the processor 220 or the memory 210. A file that is received through the communication interface 230 may be stored in a storage medium (e.g., the aforementioned permanent storage device) which may be further included in the computer device 200.

The input and output interface 240 may be means for an interface with an input and output device 250. For example, the input device may include a device, such as a microphone, a keyboard, or a mouse. The output device may include a device, such as a display or a speaker. Furthermore, for example, the input and output interface 240 may be means for an interface with a device in which functions for an input and an output have been integrated into one, such as a touch screen. At least one of the input and output devices 250, together with the computer device 200, may be configured as a single device.

Furthermore, in other embodiments, the computer device 200 may include components greater or smaller than the components of FIG. 2. However, it is not necessary to clearly illustrate most of conventional components. For example, the computer device 200 may be implemented to include at least some of the input and output devices 250 or may further include other components, such as a transceiver and a database.

In various terminals and service environments, the utilization of a user-customized artificial intelligence (AI) model is increased. In this case, information synchronization between AI models in multiple devices and environments is essential for service consistency because service continuity can be secured through synchronization between the AI model in various service use environments for users. Furthermore, AI models by the same supplier require user-customized AI model information synchronization in a safe and reliable way.

In a distributed user AI model use environment, it is necessary to provide a smooth service through interoperation between individual AI model for each situation. In this case, there is a situation in which the use of a specific AI model is limited or required due to device characteristics, a service setting range, or an institutional issue. The AI agent of a user terminal, such as a smartphone, basically has the highest frequency and information accessibility. A device environment and the AI agent of a platform supplier may be changed as a user moves.

Figure 3:
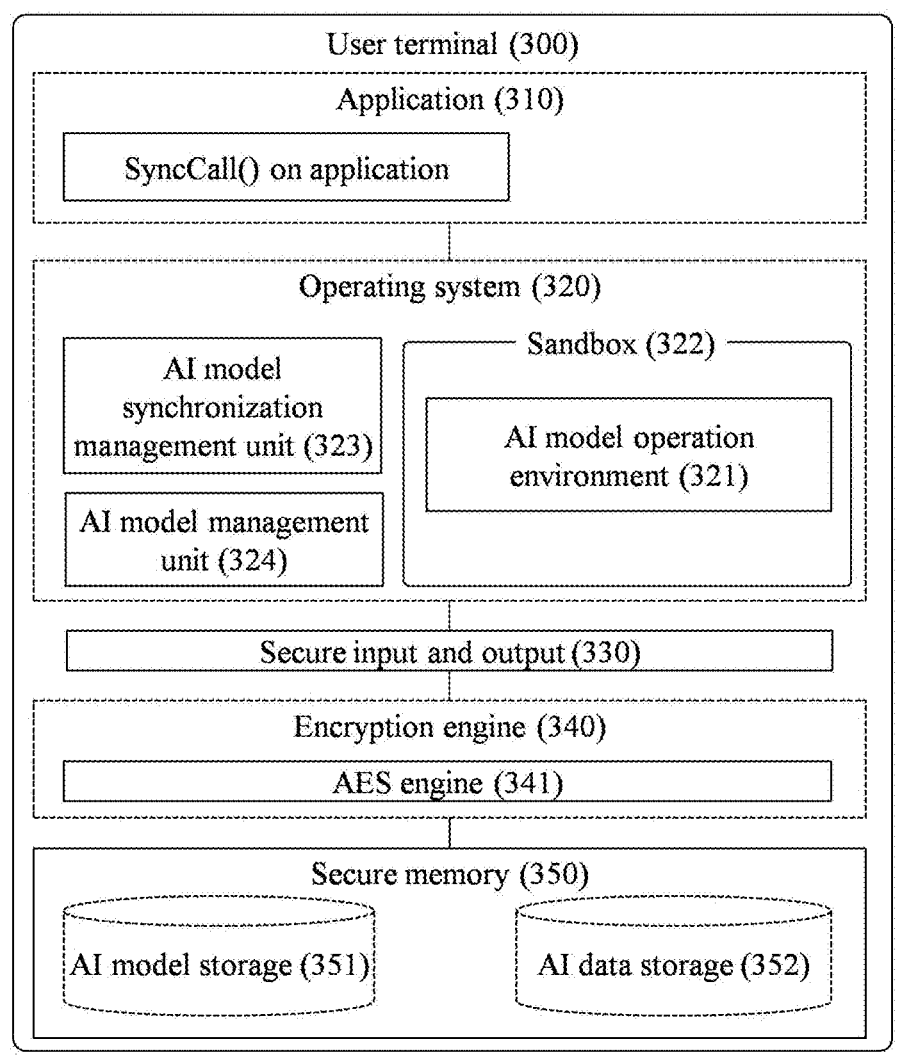
FIG. 3 is a diagram illustrating an example of a software structure of a user terminal for an operation of an AI model in an embodiment of the present disclosure.

FIG. 3 is a diagram illustrating an example of a software structure of a user terminal for an operation of an AI model in an embodiment of the present disclosure. The user terminal 300 according to the present embodiment may include an application 310, an operating system 320, secure input and output 330, an encryption engine 340, and secure memory 350.

The application 310 may request synchronization with information of an AI model by autonomously invoking a synchronization function (e.g., a "SyncCall( )" function in FIG. 3) when information of an AI model that is being used in the application 310 is required or a movement between terminals is required. In this case, the application 310 may determine whether to operate as a master or a slave, and may variously use information, such as performance of a device, a battery state, network information, and an expected operation time.

The operating system 320 may provide an AI model operation environment 321 for an operation of a model, and may need to provide a structure for a sandbox 322 in order to provide stability with the existing functions and independent performance. The operating system 320 may include an AI model synchronization management unit 323 and an AI model management unit 324.

The AI model synchronization management unit 323 may provide a synchronization function with an external service or another terminal with respect to information on an AI model of the user terminal 300. The operating system 320 may perform separate synchronization task by using the AI model synchronization management unit 323.

The AI model management unit 324 may manage information on AI models installed in a terminal environment, and may manage information on whether synchronization with an external terminal or device or a service is possible based on initially designated characteristics of a model.

The AI model operation environment 321 is a separate manage environment in which an AI model can safely operated, and may be used to manage priority management, an operating time, and a response-waiting time of an AI model to be loaded, based on a resource situation of the user terminal 300. Furthermore, the operating system 320 may further provide functions, such as access management and capacity management for separate AI model storage 351 and AI data storage 352 that are used by an AI model, through the AI model operation environment 321.

The secure input and output 330 may provide an encrypted channel upon communication with the encryption processor and the secure memory in order to safely manage major authentication information and personal information that are generated in the user terminal 300 and information on an AI model. In this case, a module capable of connection to the encrypted channel that is provided by the secure input and output 330 may include an encryption processor, a coprocessor, a hash-based message authentication code (HMAC) engine, a secure hash algorithm (SHA) engine, a key generation module, a random number generation module, an execution engine, volatile memory and/or nonvolatile memory. Data to be processed in an AI model or data (e.g., embedded vector data) processed by the AI model may be safely managed through the secure input and output 330.

The encryption engine 340 may be an engine that uses a separate hardware processor or that has been implemented in software for the purpose of encryption-related processing within the user terminal 300. In order to provide robust security, the user terminal 310 itself may provide a hardware-based encryption processing function through the encryption engine 340. Various encryption modules, such as an advanced encryption standard (AES) engine 341, may be autonomously mounted on the user terminal 300, and may provide and accelerate encryption processing.

Unlike storage, such as the existing common NAND flash or DRAM, the secure memory 350 may refer to a space in which major and/or sensitive information related to an operation of an AI model are stored and managed. The secure memory 350 may have a separate physical structure or may be logically divided. However, the encrypted channel that is provided by the secure input and output 330 may be used for the secure memory 350. In view of the characteristics of an AI model, the AI model consists of large-scale matrix operations. Accordingly, the secure memory 350 may support a high speed bus interface like memory. The AI model storage 351 may have a construction having a file storage form. The AI data storage 352 may play a role as a space in which data that are generated as inputs and outputs in an operation process of an AI model are temporarily stored, and may autonomously include a vector database.

Hereinafter, in the cases in which (1) an AI agent operates in an external device, (2) an AI agent operates in the mobile terminal of a user, and (3) multiple AI agents are used in a cloud environment, a technique for dynamically selecting and executing an AI agent in each case is described. In the case (1), the external device may refer to an external device on the basis of the user terminal 300. In the case (2), the AI agent may refer to the remaining AI agents except an AI agent of a supplier of the operating system 320 of the user terminal 300.

In the Case in which the AI Agent Operates in the External Device

In the present embodiment, AI agents of various devices can be efficiently managed and adjusted by using the user terminal 300 of a user, such as a smartphone, as a center control hub. In other words, AI agents installed in various devices can be interlocked and controlled centering around an AI agent that is provided by a mobile operating system platform supplier.

Figure 4:
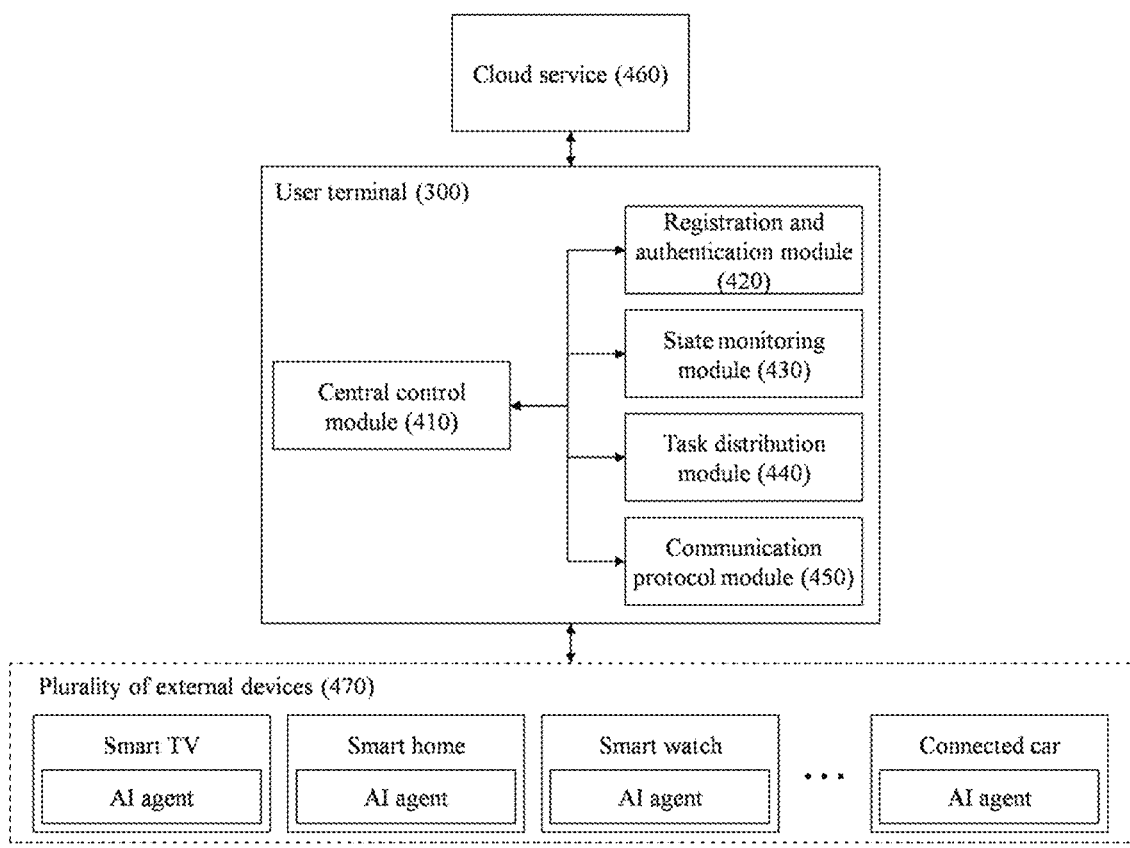
FIG. 4 is a diagram illustrating an example of a construction of a mobile-centric agent hub system (MCAHS) in an embodiment of the present disclosure.

FIG. 4 is a diagram illustrating an example of a construction of a mobile-centric agent hub system (MCAHS) in an embodiment of the present disclosure. FIG. 4 illustrating the MCAHS illustrates a central control module (CCM) 410, a registration and authentication module (RAM) 420, a state monitoring module (SMM) 430, a task distribution module (TDM) 440, and a communication protocol module (CPM) 450 that are included in the user terminal 300, and illustrates a cloud service 460 and a plurality of external devices 470 which communicate with the user terminal 300.

The central control module 410 is included in the operating system 320 of the user terminal 300, and may manage the entire system. The registration and authentication module 420 may register an AI agent of a new device with a system, and may authenticate the AI agent. The state monitoring module 430 may track a current state and availability of each AI agent in real time. The task distribution module 440 may allocate a task to an optimal AI agent by analyzing a user request. The communication protocol module 450 may support efficient and safe communication between the user terminal 300, that is, an agent hub, and each AI agent.

For example, when a user transmits a request in the form of a voice instruction or a text input, the central control module 410 may analyze the request, and may select a proper AI agent based on the registration and authentication module 420 and the state monitoring module 430. In this case, the central control module 410 may allocate a task to the selected AI agent through the communication protocol module 450, and may provide necessary context information. Furthermore, the central control module 410 may receive a response from the AI agent through the communication protocol module 450, and may transmit the response to the user or may adjust cooperation with another AI agent.

The MCAHS may provide consistent user experiences that provide the same AI service quality in various devices, can optimize the utilization of resources by using an agent that is suitable for the characteristics and situation of each device, and can improve scalability by easily integrating a new device and service into a system.

Figure 5:
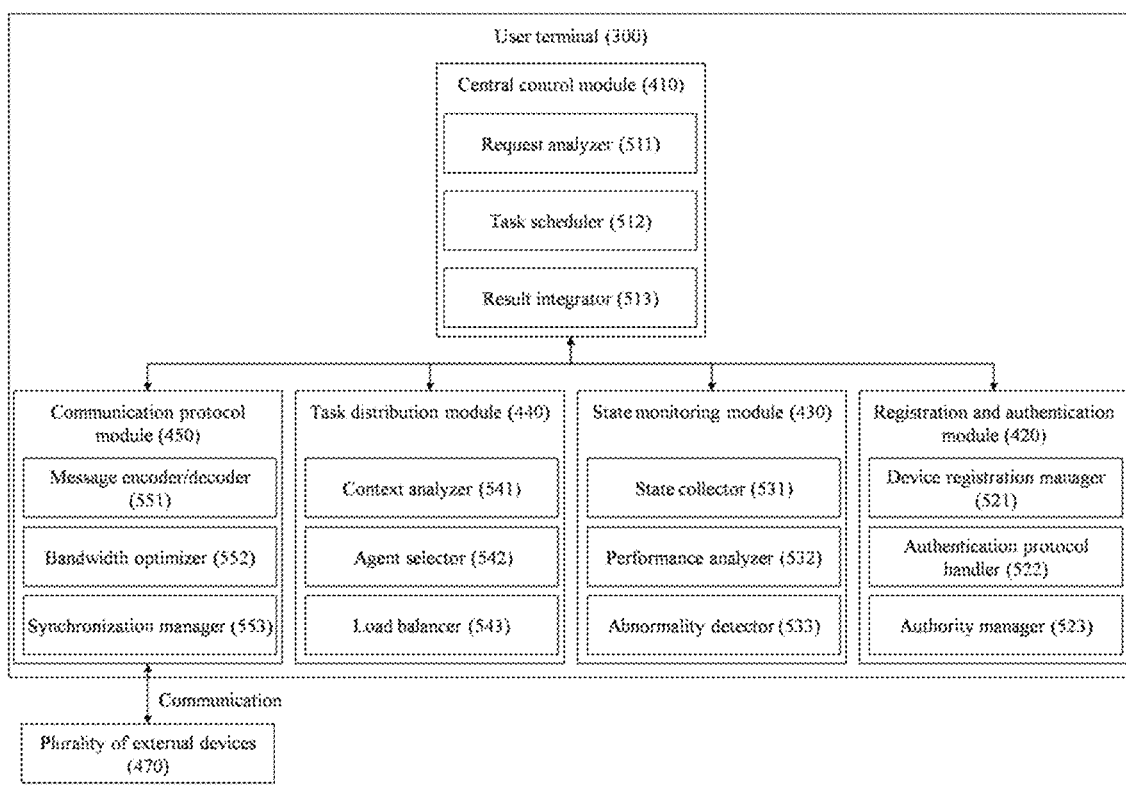
FIG. 5 is a diagram illustrating an example of detailed components of an agent hub in an embodiment of the present disclosure.

FIG. 5 is a diagram illustrating an example of detailed components of an agent hub in an embodiment of the present disclosure. The user terminal 300 that operates as an agent hub may include the central control module 410, the registration and authentication module 420, the state monitoring module 430, the task distribution module 440, and the communication protocol module 450 that have already been described.

The central control module 410 is a component for the adjustment and management of the entire system as already described above, and may include a request analyzer 511 that analyzes a user request and selects a proper AI agent, a task scheduler 512 that distributes tasks to AI agents and determines task priority, and a result integrator 513 that generates a consistent response by integrating the results of several AI agents, as sub modules.

The registration and authentication module 420 is a component for the safe registration and authentication of a new device and AI agent, and may include a device registration manager 521 that manages a registration process of a new device, an authentication protocol handler 522 that supports and manages various authentication methods, and an authority manager 523 that sets and manages the access rights of each AI agent, as sub modules.

The state monitoring module 430 is a component for tracking the state and availability of each AI agent in real time, and may include a state collector 531 that collects state information from each AI agent, a performance analyzer 532 that analyzes response time and accuracy of an AI agent, and an abnormality detector 533 that provides notification by detecting an operation of an abnormal AI agent, as sub modules.

The task distribution module 440 is a component for allocating a user request to an optimal AI agent, and may include a context analyzer 541 that analyzes a current situation and environment of a user, an agent selector 542 that selects an AI agent most suitable for a task, and a load balancer 543 that adjusts a task load balance between AI agents, as sub modules.

The communication protocol module 450 is a component for supporting efficient and safe communication between a hub and each AI agent, and may include a message encoder/decoder 551 that processes the encryption and decryption of a communication message, a bandwidth optimizer 552 that processes communication optimization according to a network situation, and a synchronization manager 553 that manages information synchronization between AI agents, as sub modules.

Figure 6:
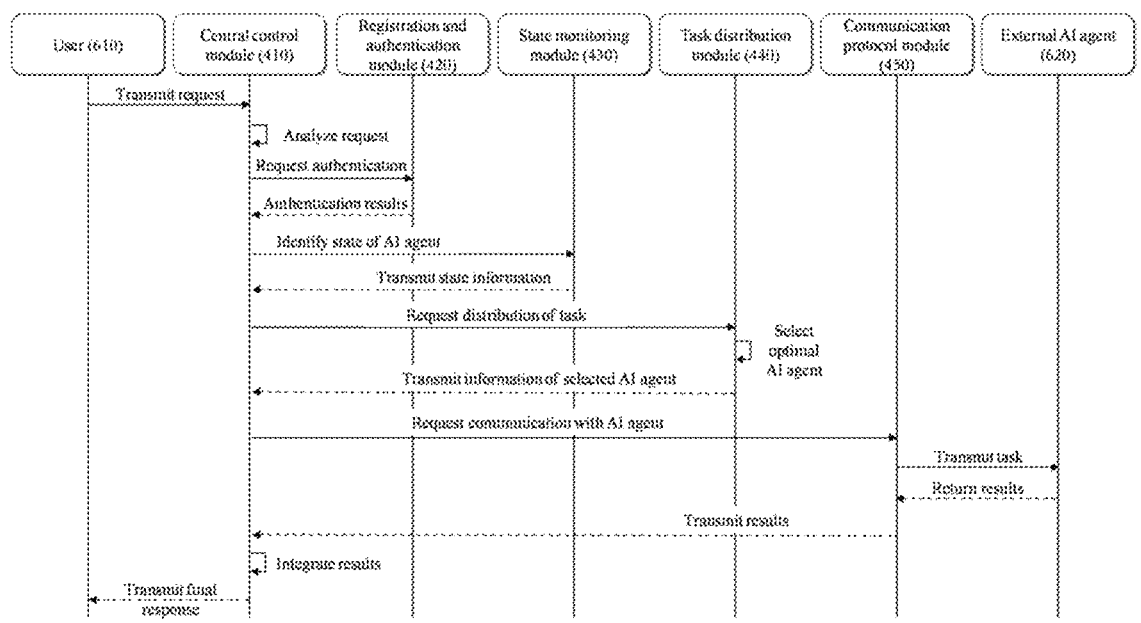
FIG. 6 is a diagram illustrating an example of an operating method of the MCAHS in an embodiment of the present disclosure.

FIG. 6 is a diagram illustrating an example of an operating method of the MCAHS in an embodiment of the present disclosure.

When a user 610 inputs a request to the user terminal 300, the request may be transmitted to the central control module 410. After analyzing the request, the central control module 410 may request the authentication of an AI agent from the registration and authentication module 420, and may receive the results of the authentication. Furthermore, the central control module 410 may identify the state of the AI agent that has been authenticated through the state monitoring module 430. In this case, the state monitoring module 430 may transmit information on the state of the AI agent to the central control module 410. The central control module 410 may request the distribution of a task to the AI agent by transmitting the state information to the task distribution module 440. In this case, the task distribution module 440 may select an optimal AI agent for the distributed task, and may transmit information on the selected AI agent to the central control module 410. In this case, one AI agent may be selected with respect to one task, but one task may be divided into multiple sub tasks and multiple AI agents for processing the multiple sub tasks may be selected. The central control module 410 may transmit the task to a corresponding AI agent (i.e., an external AI agent 620) by requesting communication with the AI agent from the communication protocol module 450. In this case, the external AI agent 620 may be an AI agent that is included in the plurality of external devices 470. If multiple AI agents for processing multiple sub tasks are selected, corresponding sub tasks may be transmitted to the multiple AI agents, respectively. Thereafter, the communication protocol module 450 may receive results that are returned by the external AI agent 620 and transmit the results to the central control module 410. In this case, the central control module 410 may transmit the final response to the user 610 by integrating the results.

For example, a situation in which a user inputs an instruction to a smartphone or a connected device in the form of voice may be considered. In this case, the central control module 410 may convert the results of voice recognition into text, and may identify a user's intent by analyzing the instruction through natural language processing (NLP). Thereafter, the central control module 410 may classify whether a required task corresponds to which kind (or type) of task based on the analyzed instruction, and may select an AI agent suitable for the classified task. For example, the central control module 410 may select a suitable AI agent based on the type of classified task, such as selecting a smart home AI agent for a home control task, a connected car AI agent for a vehicle-related task, and a smartphone AI agent for schedule management. In order to select the AI agent, the central control module 410 may identify registered/authenticated AI agents through the registration and authentication module 420, and may obtain information on the state of each AI agent through the state monitoring module 430. In this case, the central control module 410 may use the information on the state of each AI agent to select the AI agent. According to an embodiment, the central control module 410 may allocate a task by transmitting the information on the state of each AI agent to the task distribution module 440. For example, the task distribution module 440 may allocate a task to be executed to the selected agent and may prepare for required context information. According to an embodiment, in this case, the central control module 410 may communicate with the AI agent through the communication protocol module 450. The communication protocol module 450 may transmit information related to the allocated task to the selected AI agent through a protocol to which security has been applied. The selected AI agent may generate results by executing the received task, and may transmit the results back to the user terminal 300. The central control module 410 that has received the results of the task of the AI agent through the communication protocol module 450 may process the received results, and may generate the final response by integrating the results with another piece of information, if necessary. Thereafter, the central control module 410 may control the user terminal 300 to transmit the generated final response to the user in a proper form, such as voice or text.

In this case, in the natural language processing process, the central control module 410 may process sub processes, such as a tokenization process of separating a received voice instruction in an individual word or semantic unit, a part-of-speech tagging process of identifying a part of speech (e.g., nouns, verbs, or adjectives) of each token, a named entity recognition process of identifying a proper noun or a specific entity (e.g., a place, a time, or a device) and/or a syntactic parsing process of checking a subject, an object, and a predicate by analyzing the structure of a sentence.

Furthermore, in the user intent classification process, the central control module 410 may process sub processes, such as a keyword extraction process of extracting an important keyword (e.g., an operation, a target, or a condition) in the instruction, an intent matching process of matching the extracted keyword with a predefined intent category, a probability calculation process of calculating the probability of each intent category and/or a threshold comparison process of checking whether intent having the highest probability is greater than a specific threshold.

Furthermore, in the process of classifying a task necessary for the processing of the instruction, the central control module 410 may process a domain classification process, a context analysis process, a machine learning model application process, a confidence evaluation and a final decision process and/or a result delivery and logging process.

In this case, the domain classification process may include sub processes, such as a domain keyword identification process of identifying a keyword related to a specific domain (e.g., home control, a vehicle, or schedule management), a domain score calculation process of calculating a relevance score of each domain and/or a multi-domain processing process of recognizing the instruction as a complex instruction for several domains, if necessary.

Furthermore, the context analysis process may include sub processes, such as a user state identification process of identifying a current location, time, and activities of a user, reference to a previous dialogue that supplements context by referring to the contents of a previous dialogue, if necessary, and/or a device state identification process of identifying a current state and availability of related devices.

Furthermore, the machine learning model application process may include sub processes, such as a feature vector generation process of generating a feature vector based on information extracted in a previous process (e.g., the results of natural language processing, the classified user the intent, the classified domain and/or the analyzed context), a model prediction process of predicting the final instruction type by using a pre-trained machine learning model (e.g., SVM, Random Forest, or a neural network) and/or an ensemble scheme application process of performing a final determination by synthesizing the prediction results of several models.

Furthermore, the confidence evaluation and final decision process may include sub processes, such as a confidence score calculation process of calculating a confidence score of the final classification by synthesizing the results of the processes, a threshold comparison process of checking whether the confidence score is greater than a specific threshold, a user check request process of requesting a user to check the results of the classification of low confidence, if necessary, and/or a final instruction type decision process of finally determining an instruction type by synthesizing all of pieces of information.

Furthermore, the result delivery and logging process may include sub processes, such as a result delivery process of delivering the determined instruction type to a next processing process (e.g., the task distribution process of the task distribution module 440) and/or a logging and feedback process of logging the determination process and results and constructing a feedback loop for improving a future model.

Figure 7:
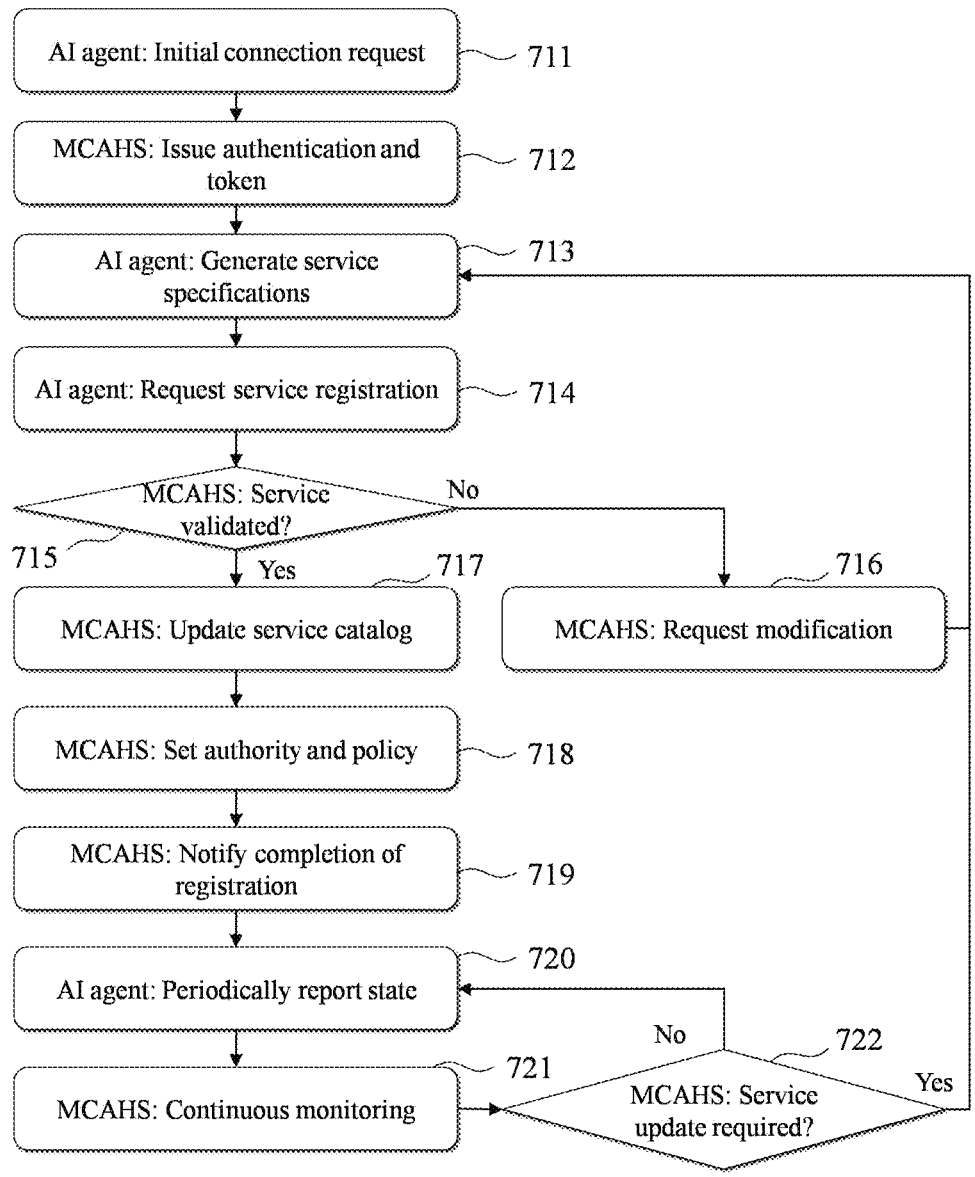
FIG. 7 is a diagram illustrating an example of a process of registering the service area of an AI agent in an embodiment of the present disclosure.

FIG. 7 is a diagram illustrating an example of a process of registering the service area of an AI agent in an embodiment of the present disclosure. The MCAHS may include an agent registration manager (ARM), a service catalog, an authentication and security module (ASM), an application programming interface (API) gateway, and the service validation engine (SVE). The AI agent may include a service specification generator, a communication interface, and an authentication client. The ARM, the service catalog, the ASM, and the SVE may be included in the registration and authentication module 420. The API gateway may be included in the communication protocol module 450. In this case, the AI agent may be one AI agent, among the plurality of external devices 470, and may correspond to the external AI agent 620.

In a first process 711, the AI agent may request a connection to the API gateway of the MCAHS. In this case, in a second process 712, the ASM of the MCAHS may identify the identity of the AI agent and issue an authentication token. For example, in a third process 713, the AI agent may generate service specifications, that is, detailed information of a service which may be provided by the AI agent, in a predefined structured format (e.g., JavaScript Object Notation (JSON)) by using the service specification generator. The service specifications may include a service name, a unique identifier, a service category (e.g., home control, schedule management, or information search), a list of supported functions and detailed description of each function, an input parameter and the format of a return value, a service quality index (e.g., a response time and accuracy), required rights and an access level and/or version information and an update history.

In a fourth process 714, the AI agent may request the registration of the service by transmitting the generated service specifications to the ARM along with the authentication token. In this case, the API gateway may validate the request and transmit the request to the ARM.

In a fifth process 715, the SVE of the MCAHS may validate the accuracy of the format of the service specifications, the safety and security of the provided service, compatibility with the existing services of the MCAHS, and the properness of a service quality index by analyzing the submitted service specifications. A sixth process 716 may be performed when the validation of the service fails based on the service specifications, and a seventh process 717 may be performed when the validation of the service is successful based on the service specifications.

In the sixth process 716, the SVE of the MCAHS may request additional information or the modification of the specifications from the AI agent. In this case, the third process 713 may be performed again.

In the seventh process 717, the ARM of the MCAHS may update a service catalog with new service information. The service catalog may systematically manage service information of all of registered AI agents.

In an eighth process 718, the ASM of the MCAHS may set access rights and a security policy for a newly registered service. In this case, the access rights and the security policy may define which user or another AI agent can use the service.

In a ninth process 719, the ARM of the MCAHS may transmit a registration completion message to the AI agent. The registration completion message may include the unique identifier of the registered service and an access token.

In a tenth process 720, the AI agent may periodically report its state and service availability to the MCAHS. In an eleventh process 721, the MCAHS may consistently monitor performance and stability of the registered service.

In a twelfth process 722, the MCAHS may determine whether a service update is required. The tenth process 720 may be performed if the service update is not required, and the third process 713 may be performed if the service update is required. A simplified validation procedure may be applied depending on the volume of a change.

All of communications may be encrypted and performed by using transport layer security (TLS) or a secure socket layer (SSL), for example. Furthermore, digital signature or a certificate may be used in the ASM of the MCAHS in order to identify the identity of the AI agent. When important information is exchanged, multi-element authentication may be applied, and a periodical security audit may be performed on the registered service.

Figure 8:
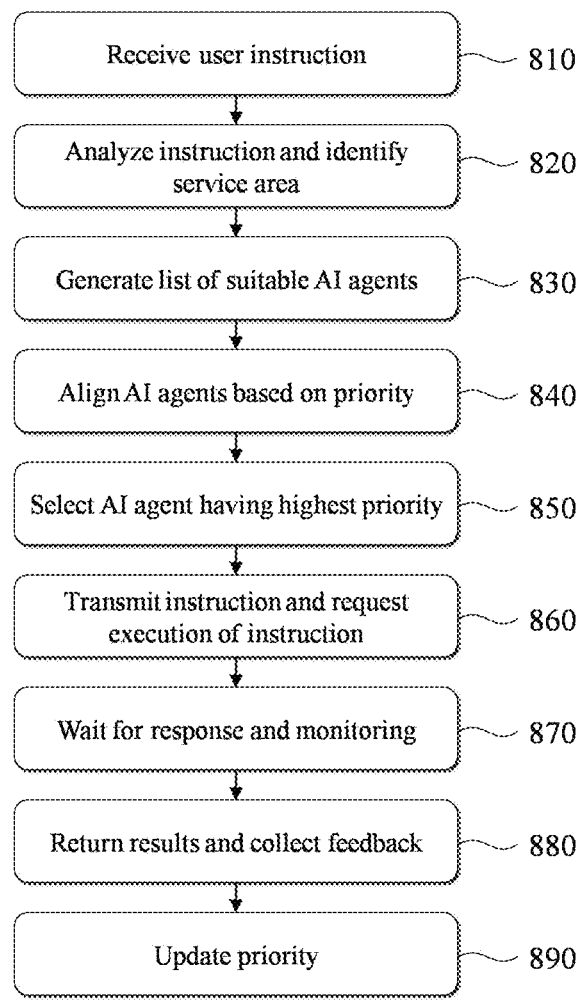
FIG. 8 is a diagram illustrating an example of a process of transmitting an instruction for AI agents that provide a redundant service area in an embodiment of the present disclosure.

FIG. 8 is a diagram illustrating an example of a process of transmitting an instruction for AI agents that provide a redundant service area in an embodiment of the present disclosure.

In a first process 810, the MCAHS may receive a user instruction.

In a second process 820, the MCAHS may analyze the instruction and identify a service area. In this case, the MCAHS may identify the service area that is necessary to process the instruction of the user by analyzing the instruction of the user.

In a third process 830, the MCAHS may generate a list of suitable AI agents. In this case, the MCAHS may list all of AI agents corresponding to the identified service area.

In a fourth process 840, the MCAHS may align the AI agents based on priority. For example, the MCAHS may align the list of AI agents by considering static priority and/or dynamic priority. The static priority may be determined based on basic priority that is set based on user preference, the assignment of priority according to a service quality index (e.g., a response speed or accuracy) and/or the incorporation of a confidence score of an AI agent. Furthermore, the dynamic priority may be determined based on the incorporation of the results of real-time performance monitoring, the analysis of a recent use pattern of a user and/or the adjustment of context-based adaptive priority.

In a fifth process 850, the MCAHS may select an AI agent having the highest priority. For example, the MCAHS may select an AI agent having the highest priority, in the list of aligned AI agents, based on the static priority and/or the dynamic priority.

In a sixth process 860, the MCAHS may transmit the instruction to the selected AI agent and request the execution of the instruction.

In a seventh process 870, the MCAHS may monitor whether a response is received from the AI agent within a preset time through a response waiting and monitoring process.

If a response fails or an error occurs, the MCAHS performs the fifth process 850 again, and may select an AI agent having next priority in the list of AI agents.

In an eighth process 880, the MCAHS may return results that have been successfully executed to the user, and may collect satisfaction feedback.

In a ninth process 890, the MCAHS may update priority. For example, the MCAHS may update the priority of the AI agents based on the collected feedback and the results of the execution. A list of AI agents having the updated priority may be subsequently used to select an AI agent for the same service area. Furthermore, at timing at which the AI agent is selected, the priority of the list may be additionally changed through the dynamic priority.

Furthermore, for the effective delivery of an instruction, if the importance of the instruction is high or it is out of time, the MCAHS may perform parallel processing in which the fastest and accurate response is selected by transmitting the instruction to a plurality of AI agents belonging to a list at the same time.

Furthermore, as already described, the MCAHS may select an AI agent by further considering context, such as a current situation (e.g., a location, a time, or activities) of a user.

Furthermore, the MCAHS may divide the instruction into a plurality of sub instructions by considering the complexity of the instruction. In this case, the MCAHS may transmit the sub instructions to a plurality of AI agents, and may generate the final results by combining partial results that are transmitted from the plurality of AI agents.

Furthermore, the MCAHS may request the selection of an AI agent from the user. For example, in a situation in which the importance of the instruction is high or ambiguous, the MCAHS may provide the rights to select an AI agent to the user.

Furthermore, the MCAHS may optimize a method of transmitting the instruction by learning and analyzing the transmission of the instruction and the results of the execution of the instruction through a machine learning model.

As a more detailed example of the instruction processing process, a situation in which a user has inputted an instruction "find me the cheapest laptop" may be considered. In this case, the MCAHS may identify a service area "shopping" by analyzing the instruction, may extract a keyword "laptop", and may recognize a task "price comparison". In this case, the MCAHS may generate a list of AI agents. For example, the MCAHS may list AI agents related to shopping, such as a market A, a shopping mall B, and an electronics market C. Thereafter, the MCAHS may align the list of AI agents according to priority. The priority may be determined by considering user preference, price comparison accuracy, or recent use frequency. Furthermore, the MCAHS may select an AI agent having the highest priority and transmit the instruction to the selected AI agent. For example, when an AI agent of the shopping mall B is selected, the MCAHS may transmit a notebook price comparison instruction to the AI agent of the shopping mall B. Thereafter, the MCAHS may wait for a response for a preset response waiting time (e.g., 5 seconds). In this case, when results are successfully received from the AI agent within the response waiting time, the MCAHS may transmit the results to the user and request satisfaction feedback from the user. In contrast, when the transmission of result fails due to an error or a lapse of the response waiting time, the MCAHS may transmit the same instruction to an AI agent of the market A having next priority. Thereafter, the MCAHS may update the priorities of the AI agents by incorporating the results of the execution and the user feedback.

Figure 9:
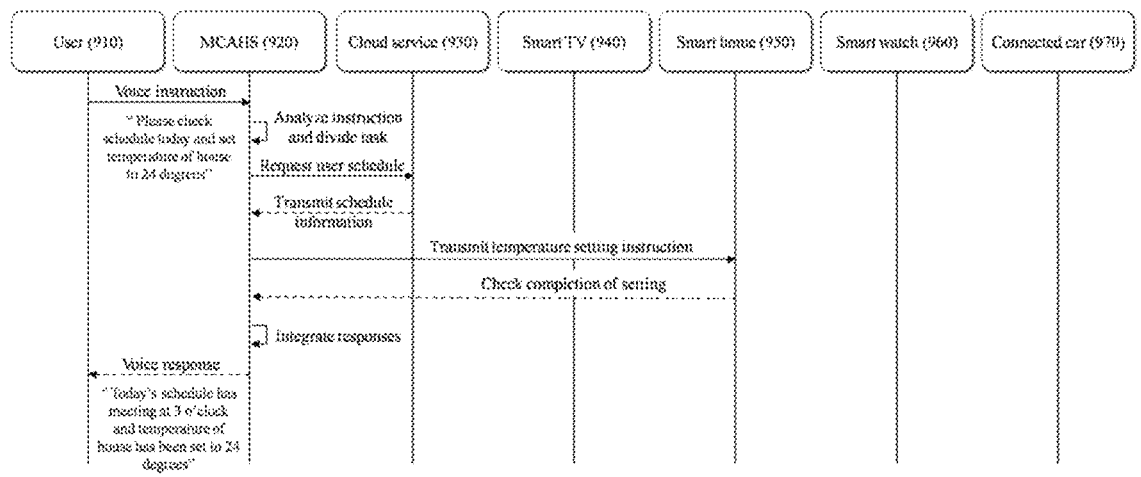
FIGS. 9 and 10 are diagrams illustrating examples of an interoperation between the MCAHS and a surrounding system in an embodiment of the present disclosure.
Figure 10:
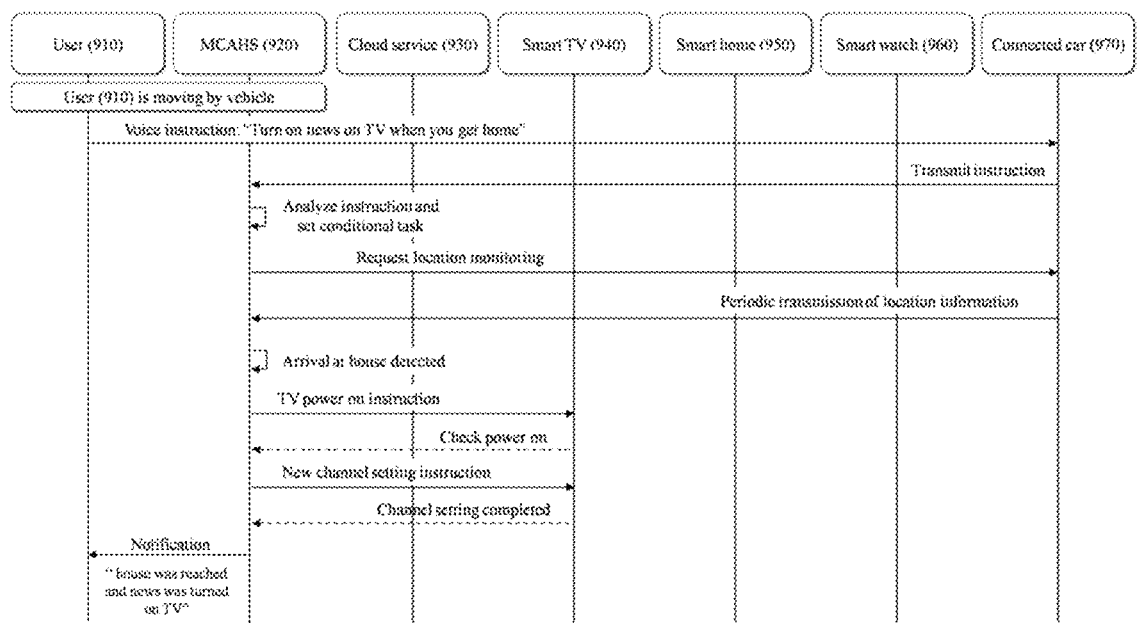

FIGS. 9 and 10 are diagrams illustrating examples of an interoperation between the MCAHS and a surrounding system in an embodiment of the present disclosure. FIGS. 9 and 10 illustrate a user 910, an MCAHS 920, a cloud service 930, smart TV 940, a smart home 950, a smart watch 960, and a connected car 970. In this case, the MCAHS 920 may be included in the user terminal 300, such as a smartphone of a user. Furthermore, the cloud service 930, the smart TV 940, the smart home 950, the smart watch 960, and the connected car 970 may each mean an AI agent that is included in a service or a device.

FIG. 9 illustrates an example of a case in which the MCAHS 920 included in the smartphone of the user 910 receives a voice instruction "Please check the schedule today and set the temperature of the house to 24 degrees" of the user 910. In this case, the MCAHS 920 may analyze the instruction and divide a task. For example, the task may be divided into a task that checks a today schedule and a task that sets the temperature of the house to 24 degrees. In this case, the MCAHS 920 may request a user schedule from the cloud service 930 and receive schedule information from the cloud service 930. In this case, the cloud service 930 may be an AI agent that substantially manages schedule information of the user 910 in the cloud service 930. Furthermore, the MCAHS 920 may transmit a temperature setting instruction to the smart home 950, and may receive a response for the check of the setting completion from the smart home 950. The embodiment of FIG. 9 illustrates an example in which schedule check and temperature setting are processed in time series, but the two tasks may be processed in parallel. Thereafter, the MCAHS 920 may provide the user 910 with a voice response "Today's schedule has a meeting at 3 o'clock. The temperature of the house has been set to 24 degrees." by integrating the processing results of the two tasks.

FIG. 10 illustrates an example of a case in which the connected car 970 receives a voice instruction "Turn on news on TV when you get home" in a process of the user 910 moving in a car. In this case, the connected car 970 may be an AI agent that is substantially included in the connected car 970. The connected car 970 may transmit the received instruction to the MCAHS 920. In this case, the MCAHS 920 may set a conditional task by analyzing the instruction. First, the MCAHS 920 may request location monitoring from the connected car 970. The connected car 970 may periodically transmit the location information to the MCAHS 920. The MCAHS 920 may identify the location of the user 910 based on the location information, and may transmit a TV power-on instruction to the smart TV 940 by detecting that the user 910 has reached the house. Thereafter, after checking that the smart TV 940 has been powered on, the MCAHS 920 may transmit a new channel setting instruction to the smart TV 940, and may identify that channel setting has been completed. In this case, the MCAHS 920 may transmit notification "The house was reached, and news was turned on the TV" to the user 910.

As described above, advantages of a method using the MCAHS in the case in which the AI agent operates in the external device are listed in Table 1.

TABLE 1

| Advantages | Contents |
| --- | --- |
| Centralized management and adjustment | Integrate and manage various AI agents centering around a smartphone |
|  | Efficiently process requirements of a user and distribute a task to a proper agent |
|  | Provide consistent user experiences between several devices and a service |
| Intelligence service based on situation recognition | Provide an optimal service based on context information, such as the location, time, and activities of a user |
|  | Pre-emptively identify and realize user intent through conditional task setting and execution |
|  | Enable a more comprehensive and intelligent service implementation through association between various devices and a service |
| scalability and flexibility | Have a structure which can easily integrate a new device or service into a system |
|  | Easy expansion of a service ecosystem by providing compatibility with various AI agents |
|  | Provide flexibility which enables the customization of a system when required by a user |
| Enhancement of security and privacy | Can control and monitor a flow of data through a smartphone, that is, a central hub |
|  | Secure the safety of data by applying a security protocol to communication with each agent |
|  | Minimize a danger of information leakage by managing sensitive information of a user in the center |

TABLE 1-continued

| Advantages | Contents |
| --- | --- |
| Resource optimization | Efficiently use system resources by selectively using an agent suitable for the characteristics and situation of each device Can use additional computing resources, if necessary, through association with a cloud service Optimize performance of the entire system by dynamically allocating resources based on the priority and importance of a task |

In the Case in which the AI Agent Operates in the Mobile Terminal of a User

The present embodiment relates to the construction of a system in which a voice instruction of a user is received through an AI agent that is provided by a smartphone operating system service provider, and an AI agent application that is most suitable, among various AI agent applications installed in a corresponding mobile platform, is selected and performs a task.

Figure 11:
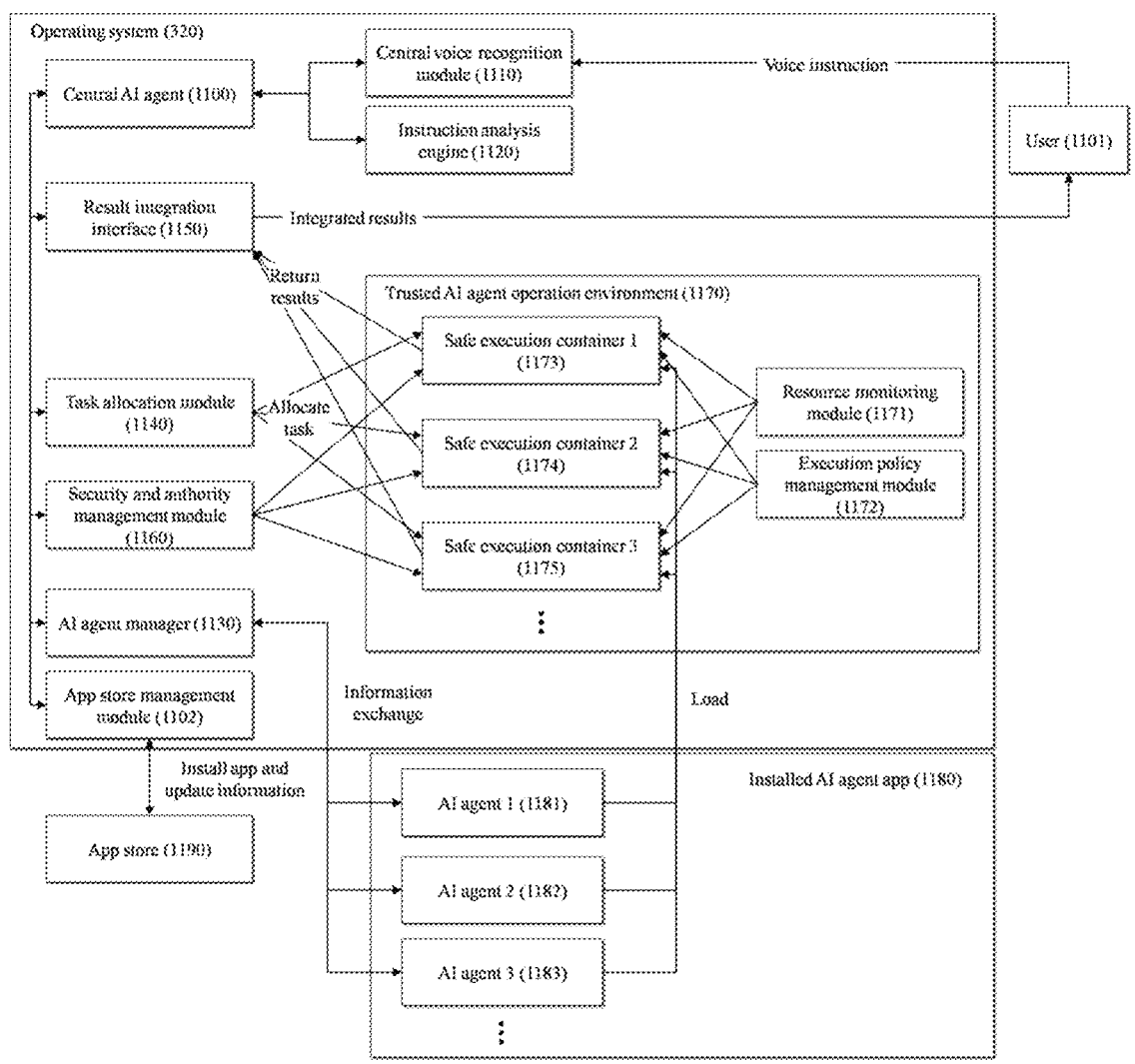
FIG. 11 is a diagram illustrating an example of a construction of an MCAHS including a safe execution environment in an embodiment of the present disclosure.

FIG. 11 is a diagram illustrating an example of a construction of an MCAHS including a safe execution environment in an embodiment of the present disclosure.

Such an MCAHS may include a central AI agent 1100 that operates in a mobile operating system level. Furthermore, the MCAHS may include a central voice recognition module 1110 that receives and interprets a voice instruction of a user 1101, an instruction analysis engine 1120 that identifies the intent of the interpreted instruction and a required service area, an AI agent manager 1130 that manages information and capabilities of all of installed AI agent apps, a task allocation module 1140 that selects an optimal AI agent based on the analyzed instruction and that allocates a task, a result integration interface 1150 that provides the results of the execution of various AI agents to the user 1101 in a consistent format, and a security and authority management module 1160 that manages data sharing and access rights between AI agents.

For example, when the user 1101 inputs a voice instruction, the central voice recognition module 1110 may convert the voice instruction into text. In this case, the instruction analysis engine 1120 may identify a required service area and a detailed task by analyzing the converted text. The AI agent manager 1130 may generate a list of AI agents suitable for the identified service area. Furthermore, the task allocation module 1140 may select an optimal AI agent by considering the capability of an AI agent, preference of the user 1101, and past performance. In this case, the MCAHS may allocate a task to the selected AI agent and provide additional information or authority, if necessary. Furthermore, the MCAHS may transmit the results of the execution of the AI agent to the user 1101 in a consistent format through the result integration interface 1150, may evaluate performance of the AI agent based on the results of the execution of the task and user feedback, and may update data.

The MCAHS can integrate user experiences because various AI agents can be used as a single interface, and can optimize resources because system resources are efficiently used by managing an AI agent in an operating system level. Furthermore, the MCAHS can reinforce security by reinforcing data protection and privacy by applying a centralized security policy, and can improve scalability because a new AI agent app can be easily integrated into a system. Furthermore, the MCAHS can improve overall performance of individual AI agents and a system because performance of the AI agents can be consistently monitored and improved.

A trusted AI agent operation environment 1170 may include a resource monitoring module 1171 that monitors and limits the resource use of each AI agent, an execution policy management module 1172 that manages a policy to control the behavior and access rights of an AI agent, and a plurality of safe execution containers 1173 to 1175 that executes each AI agent in an isolated environment. The number of executed containers may be different depending on the number of AI agents to be executed.

An installed AI agent app 1180 may refer to apps for AI agents 1181 to 1183 installed in the user terminal 300. The apps are not directly executed, and may be loaded and executed in the safe execution containers 1173 to 1175 within the trusted AI agent operation environment 1170. FIG. 11 illustrates the three AI agents 1181 to 1183, but the number of AI agents is not limited thereto.

Furthermore, the security and authority management module 1160 may be directly to the safe execution containers 1173 to 1175, and may apply a security policy. The resource monitoring module 1171 may monitor and limit the resource use of each of the safe execution containers 1173 to 1175. The execution policy management module 1172 may finely control the behavior and access rights of each AI agent. The task allocation module 1140 may directly allocate tasks to the safe execution containers 1173 to 1175. The results of the execution of the tasks may be directly transmitted from the safe execution containers 1173 to 1175 to the result integration interface 1150. As already described, the result integration interface 1150 may provide integrated results to the user 1101 by integrating returned results.

Such a construction can provide improved security because an AI agent is executed in an isolated environment and thus the influence of the AI agent on a system and another app is minimized. Furthermore, the construction enables fine control because the behavior and resource use of each AI agent can be monitored and controlled more accurately. The construction can provide a consistent execution environment by providing a standardized and safe execution environment to all of AI agents. Furthermore, the construction can dynamically adjust a security policy and access rights during execution.

The central AI agent 1100 is a component for adjusting and managing the entire system, and may include a task adjuster that adjusts a flow of a task between several modules, a system state monitor that monitors the state of the entire system in real time and/or an agent performance evaluator that consistently evaluates performance of each AI agent, as sub modules.

The central voice recognition module 1110 is a component for converting a voice instruction of the user 1101 into text, and may include a voice signal processor that processes a raw voice signal, a voice-text converter that converts a processed signal into text and/or a noise eliminator that improves recognition accuracy by eliminating surrounding noise, as sub modules.

The instruction analysis engine 1120 is a component for identifying intent and a required service by analyzing converted text, and may include a natural language processor that analyzes a linguistic structure of text, an intent classifier that classifies a user's intent and/or an entity extractor that extracts important information (entity) from an instruction, as sub modules.

The AI agent manager 1130 is a component for managing information and capabilities of installed AI agent apps, and may include an agent registration manager that manages a process of registering a new AI agent, a capability catalog that catalogs the capability (e.g., an executable function or service) of each AI agent and/or a state tracker that tracks a current state of each AI agent, as sub modules.

The task allocation module 1140 is a component for selecting a proper AI agent and allocating a task, and may include an agent selection algorithm for selecting an optimal AI agent, a task distributor for distributing a task to a selected AI agent and/or a load balancer that adjusts a task load between AI agents, as sub modules.

The result integration interface 1150 is a component for integrating and providing the results of the execution of various AI agents, and may include a result collector that collects results from several AI agents, a format converter that converts results having various formats into a consistent format and/or a response generator that generates integrated results in the form of a user-friendly response, as sub modules.

The security and authority management module 1160 is a component for managing data sharing and access rights between AI agents, and may include an authentication manager that manages a process of authenticating an AI agent, an authority controller that controls a system and data access rights of each AI agent and/or a data encryption engine that manages the encryption and decryption of sensitive data, as sub modules.

An app store manage module 1102 is a component for synchronizing installed app and AI agent information with an app store 1190, and may include an app installation manager that manages a process of installing a new AI agent app, an update checker that checks the update of an installed AI agent app and/or a license manager that manages a license state of an AI agent app, as sub modules.

The trusted AI agent operation environment 1170 is a component for providing an environment in which an AI agent is safely executed and managed, and may include the safe execution containers 1173 to 1175 for executing each AI agent in an isolated environment, the resource monitoring module 1171 that monitors and limits the resource use of each AI agent, the execution policy management module 1172 that manages a policy to control the behavior and access rights of an AI agent, a sandbox manager that dynamically constructs and manages an execution environment of an AI agent and/or a security test logger that logs and analyzes all of the activities of an AI agent, as sub modules.

A structure in which the trusted AI agent operation environment 1170 is used can provide improved security because an AI agent is executed in an isolated environment and thus the influence of the AI agent on a system and another app is minimized, and enables fine control because the behavior and resource use of each AI agent can be monitored and controlled more accurately. Furthermore, the structure can provide a consistent execution environment by providing a standardized and safe execution environment to all of AI agents, and can dynamically adjust a security policy and access rights during execution.

The MCAHS may manage a process of selecting an AI agent based on the most suitable app in order to process a request from a user. In this case, various elements, such as user preference, association with a payment system, user location information, and advertising association, may be considered a criterion for the selection.

Figure 12:
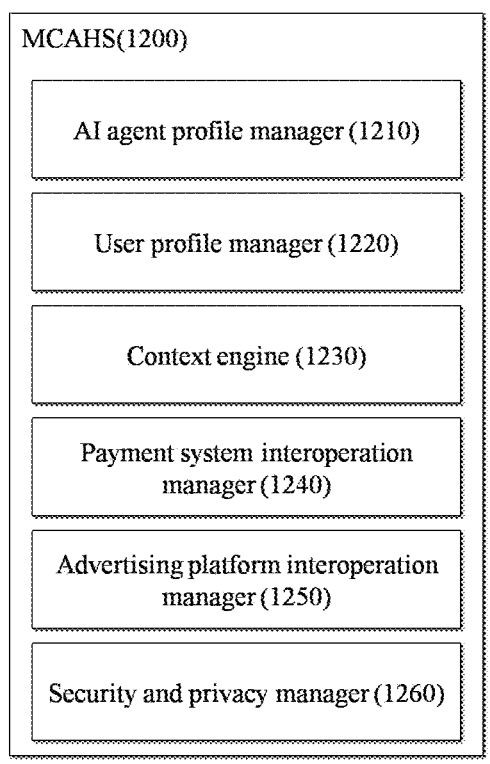
FIG. 12 is a diagram illustrating an example of components of an MCAHS for the selection of an AI agent in an embodiment of the present disclosure.

FIG. 12 is a diagram illustrating an example of components of an MCAHS for the selection of an AI agent in an embodiment of the present disclosure. An MCAHS 1200 according to the present embodiment may include an AI agent profile manager 1210, a user profile manager 1220, a context engine 1230, a payment system interoperation manager 1240, an advertising platform interoperation manager 1250 and/or a security and privacy manager 1260 for the selection of an AI agent. For example, the user profile manager 1220, the context engine 1230, the payment system interoperation manager 1240, the advertising platform interoperation manager 1250 and/or the security and privacy manager 1260, among the components of FIG. 12, may be included in the task allocation module 1140 that selects a proper AI agent and allocates a task as described in the embodiment of FIG. 11 or may be associated with the task allocation module 1140. The AI agent profile manager 1210 may correspond to the AI agent manager 1130.

When receiving a voice or text request from a user, the MCAHS may identify the intent of the request and a required function through the context engine 1230. In this case, the AI agent profile manager 1210 may generate a list of AI agents capable of processing the request. A criterion for selecting an AI agent may include user preference that is obtained by the user profile manager 1220 by analyzing a user's past use pattern and explicit preference, whether a payment system checked through the payment system interoperation manager 1240 is associated in the case of a service that requires payment, location information that is obtained so that the context engine 1230 preferentially considers an AI agent related to a current user location and/or information on advertising association that is obtained by the advertising platform interoperation manager 1250 by reviewing an advertising association possibility for profit optimization.

Furthermore, the MCAHS may identify and validate the authority of each AI agent and the privacy setting of a user through the security and privacy manager 1260.

In this case, the MCAHS may select the most suitable AI agent by synthesizing all of criteria, may allocate a task to the selected AI agent, may receive the results of the execution of the task, and may transmit the results to the user.

The AI agent profile manager 1210 may register and manage an AI agent, may include a capability catalog in which the capabilities of AI agents are cataloged, and may include a module for evaluating performance and confidence of each AI agent.

The user profile manager 1220 may include a module for learning preference of a user, a module for analyzing the use pattern of a user, and a module for managing personal information setting of a user.

The context engine 1230 may include a module for processing location information, a module for analyzing time-based context, and a module for monitoring the state of a device.

The payment system interoperation manager 1240 may include a module for validating payment information and/or a module for managing a transaction log.

The advertising platform interoperation manager 1250 may include an advertising matching engine and a profit optimization module.

The security and privacy manager 1260 may include an authority management module, a data encryption engine and/or a privacy setting forced module.

According to the present embodiment, the MCAHS 1200 can consistently adjust priority for selecting an AI agent based on the behavior pattern of a user and feedback by synthesizing the criteria of the components. Furthermore, the MCAHS 1200 may process a complicated request by combining the functions of several AI agents, if necessary, and may select an optimal AI agent by considering a current situation (or context), such as the time, a location, or a device state. Furthermore, the MCAHS 1200 may select an AI agent by preferentially considering privacy setting of a user, may determine data sharing, and can provide the transparency of a process of selecting an AI agent by providing a function capable of identifying a selection reason and processing process for the AI agent, if a user wants.

Security techniques of the trusted AI agent operation environment 1170 are listed in Table 2.

Figure 13:
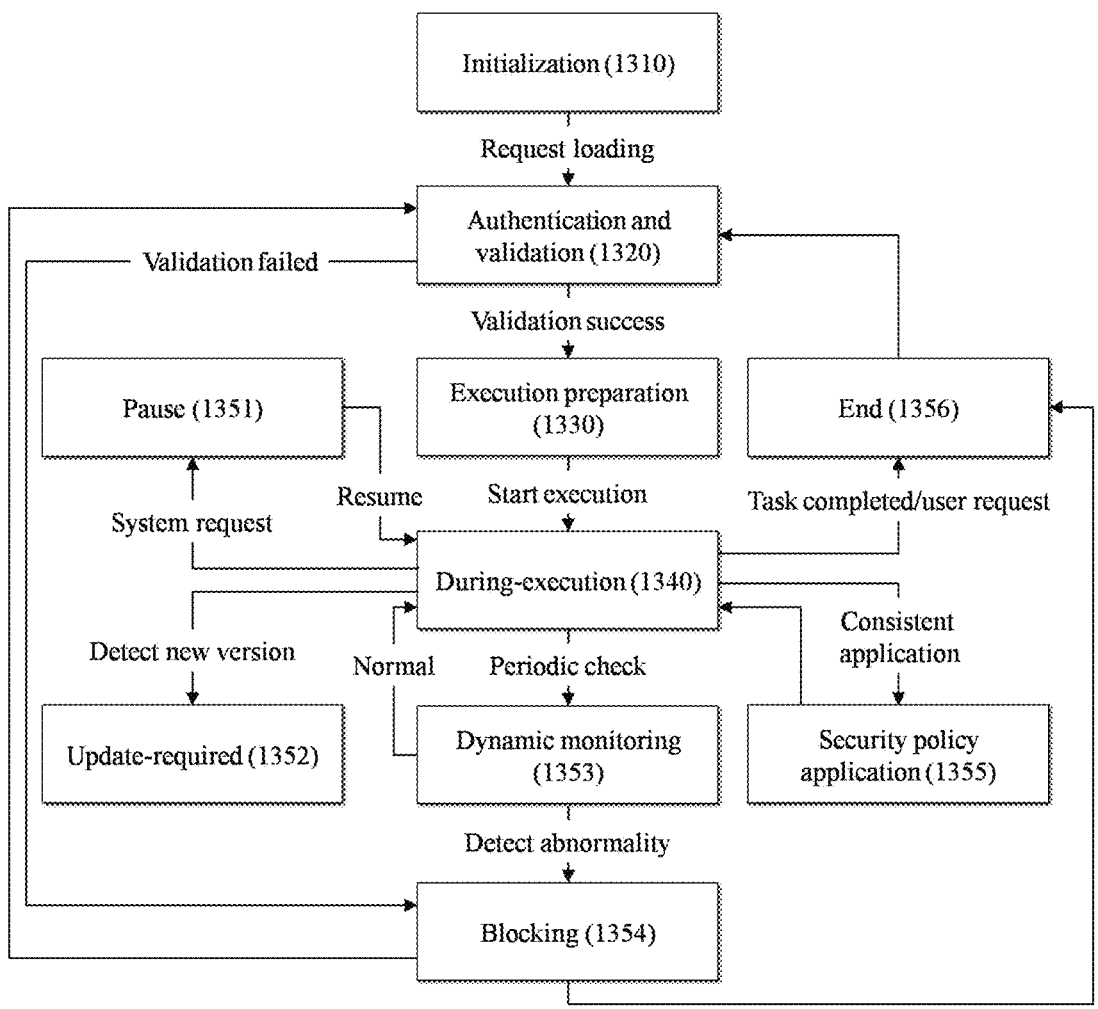
FIG. 13 is a diagram illustrating an example of a state diagram of a trusted AI agent operation environment in an embodiment of the present disclosure.

FIG. 13 is a diagram illustrating an example of a state diagram of a trusted AI agent operation environment in an embodiment of the present disclosure.

An initialization state 1310 may refer to a state when an AI agent is first loaded.

An authentication and validation state 1320 may refer to a state in which the integrity and authority of an AI agent are identified. In this case, in the trusted AI agent operation environment 1170, code signature of the AI agent may be validated, whether a code of the AI agent has not been modified or the integrity of the code may be identified, and whether authority requested by the AI agent is proper may be checked.

An execution preparation state 1330 may refer to a state in which the AI agent that has passed authentication and validation waits for execution.

A during-execution state 1340 may refer to a state in which the AI agent actually performs a task. In this case, in the trusted AI agent operation environment 1170, system resources that are necessary for the AI agent to perform a task may be allocated, and the AI agent may actually perform the task and return the results of the task.

TABLE 2

| Security techniques | Objects | Implementations |
| --- | --- | --- |
| Hardware-based isolation | Reinforce security by physically isolating environment in which an AI agent is executed | a) Dedicated security processor: a dedicated security processor for the execution of an AI agent is mounted separately from a main processor<br>b) Encryption engine: provide an encryption/decryption function in a hardware level<br>c) Security booting: validate the integrity of an AI agent upon booting |
| Cryptographic Key Management | Safe storage and use of important data related to an AI agent | a) Unique ID: generate and store a unique ID (UID) for each device<br>b) Key generation: generate a cryptographic key based on a UID<br>c) Key isolation: allocate a separate key to each AI agent |
| Secure Enclave Communication Protocol | Guarantee safe communication between an AI agent and a main OS | a) Encrypted mail box: construct an encrypted communication channel for data exchange<br>b) Session key: use a unique temporary key for each communication session<br>c) Integrity validation: apply digital signature to all of messages |
| Dynamic Trust Measurement | Guarantee runtime integrity of an AI agent | a) Code signature: validate code signature when an AI agent is loaded<br>b) Runtime measurement: periodic integrity check during the execution of an AI agent<br>c) Abnormality detection: detect and block an abnormal operation pattern |
| Secure Data Storage | Safe storage of important data related to an AI agent | a) Encryption storage: automatic encryption when data are stored<br>b) Key chain: Safe management of a cryptographic key<br>c) Data separation: allocate an independent space to each AI agent |
| Remote Attestation | Remotely validate the integrity of an AI agent | a) Challenge-response mechanism: validate a response from an AI agent for the challenge of a server<br>b) Hardware-based trust anchor: implement a function similar to a trusted platform module (TPM)<br>c) Proof generation: generate encryption proof for a current state of an AI agent |
| Secure Update Mechanism | Guarantee safe update of an AI agent | a) Version management: safely manage version information of an AI agent<br>b) Increment update: selectively update only a required part<br>c) Rollback prevention: prevent a malicious downgrade attack |
| Audit Logging | Record all of important activities of an AI agent | a) Security log: log and store in an encrypted form<br>b) Integrity guarantee: implement a hash chain for a log item<br>c) Remote logging: real-time remote logging of an important event |

A pause state 1351 may refer to a state in which the execution of the AI agent has been temporarily stopped in response to a system request.

An update-required state 1352 may refer to a state in which an AI agent having a new version is detected and updates are required.

A dynamic monitoring state 1353 may refer to a state in which a secure monitoring task is consistently performed during the execution of the AI agent. In this case, when abnormality is detected in dynamic monitoring, it may result in a blocking state 1354.

The blocking state 1354 may refer to a state in which the execution of the AI agent has been blocked because a security threat is detected. Even in the authentication and validation state 1320, when validation fails, the authentication and validation state 1320 may be changed into the blocking state 1354. The blocking state 1354 may be changed into the authentication and validation state 1320, so that authentication and the validation may be performed on the AI agent again.

A security policy application state 1355 may refer to a state in which a security policy is consistently applied to the AI agent.

An end state 1356 may refer to a state in which the execution of the AI agent is completed or terminated by a user request. Even in this case, the end state 1356 may be changed into the authentication and validation state 1320, so that authentication and the validation may be performed on the same or different AI agent again.

Advantages of a method using the MCAHS in the case in which an AI agent operates in the mobile terminal of a user are list in Table 3.

TABLE 3

| Advantages | Contents |
| --- | --- |
| Integrated user experience | A user can access all of service through the central OS AI agent without the need to separately invoke an AI agent of an individual app<br>A learning curve is reduced and user convenience is greatly improved because functions of various apps can be used as a consistent interface |
| Distribution of intelligent task | An AI agent in the OS level can allocate a task to an AI agent of the most suitable app by analyzing a request from a user<br>In the case of a complicated request, the best results can be provided by combining AI agents of several apps |
| Resource optimization | Resources (e.g., a CPU, memory, and a battery) of a device can be efficiently used through centralized management<br>The redundant loading of an unnecessary AI model is prevented, and resources are dynamically allocated, if necessary |
| Improved security and privacy | The execution and data of all of AI agents are safely managed through the sandbox and the encryption engine in the OS level<br>Access to user data can be controlled more finely through centralized authority management |
| Improved performance | AI performance of an individual app is improved because a common AI function is provided in the OS level<br>An AI processing speed is improved by efficiently using hardware acceleration |
| Consistent learning and improvement | Overall AI performance can be improved by safely sharing data and insights collected by AI agents of various apps<br>More accurate prediction and recommendation are possible by synthetically analyzing the behavior pattern of a user |
| Create new service | A new service that is not present can be easily created by combining AI functions of several apps<br>Developers can create an innovative app by using the AI capability of another app |
| Provide user-customized experience | A more personalized service can provided by synthetically analyzing user data collected from various apps<br>Intelligent recommendation and an automated task into which a situation and context are considered are performed |
| Increased energy efficiency | Power consumption of a device can be reduced by executing an AI task through the best timing and method<br>Battery lifespan is extended by minimizing an unnecessary background AI process |
| Improved accessibility | The accessibility of all users including the handicapped is improved by integrating and supporting various input methods, such as a voice instruction and gesture recognition<br>A language barrier can be reduced through automatic translation or voice conversion using AI |
| Fast problem solving and customer support | A complicated problem can be rapidly solved by combining the AI capabilities of several apps<br>A customer service that is consistent and effective can be provided through the integrated AI support system |
| Data synergy effect | Deeper insights can be derived by safely combining data collected from various apps<br>A user behavior can be comprehensively understood through cross-app data analysis |

In the Case in which Multiple AI Agents are Used in the Cloud Environment

The present embodiment relates to a system that receives a voice instruction of a user through an AI agent that is provided by a smartphone operation system service provider and that provides a service in association with AI agents located in the cloud.

Apps having various AI functions have been installed in a current mobile device, but there is a difficulty in integrally using the apps. In general, the AI capability of an individual app is limited, and it is difficult to solve a complicated user need through a single app. Furthermore, in general, it is difficult to directly execute an advanced AI function in the mobile due to limited computing power of a mobile device. There is an increasing need to provide an AI service that protects the privacy of a user and that is effective.

Accordingly, the present embodiment may provide a method and system which can efficiently process a user instruction through a central AI agent in a mobile operating system, can perform a complicated AI task by using a cloud-based AI inference service, and can integrally use the AI capabilities of apps installed in a user mobile device. Furthermore, the present embodiment may provide an advanced AI function which can provide the scalability of an AI function through association with the external AI service, can provide an personalized AI service while protecting the privacy of a user, and can optimize the resource use of a mobile device.

Figure 14:
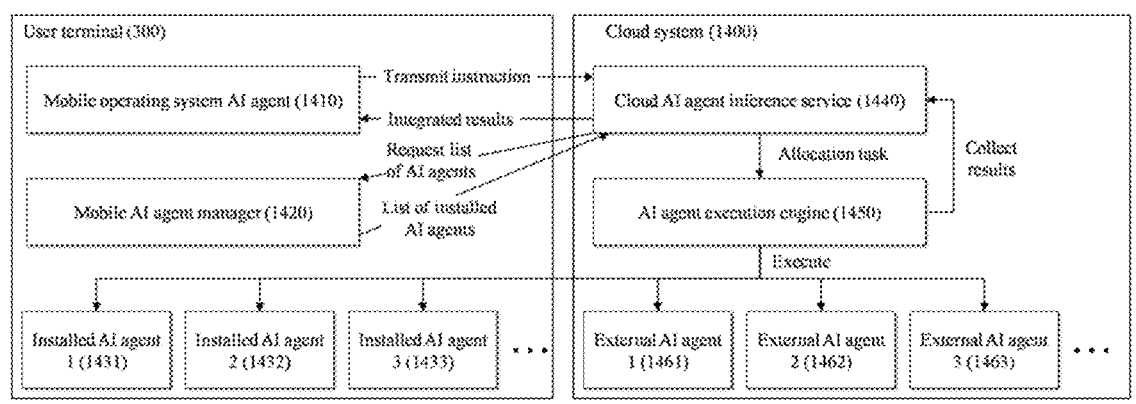
FIG. 14 is a diagram illustrating an example of internal components of an AI agent system based on the cloud in an embodiment of the present disclosure.

FIG. 14 is a diagram illustrating an example of internal components of an AI agent system based on the cloud in an embodiment of the present disclosure. FIG. 14 illustrates the user terminal 300 and a cloud system 1400. The user terminal 300 may include a mobile operating system AI agent 1410, a mobile AI agent manager 1420, and a plurality of installed AI agents 1431 to 1433. Furthermore, the cloud system 1400 may include a cloud AI agent inference service 1440, an AI agent execution engine 1450, and a plurality of external AI agents 1461 to 1463. The embodiment of FIG. 14 illustrates the three or more installed AI agents 1431 to 1433 and the three or more external AI agents 1461 to 1463, but may include a case in which one or two AI agents are used.

The mobile operating system AI agent 1410 is an AI agent that is provided by an operating platform supplier of a mobile device, such as the user terminal 300 of a user, and may play a role as a central interface that receives and processes a user instruction. For example, the mobile operating system AI agent 1410 may analyze the instruction of a user and play a role of transmitting the instruction of the user to the cloud system 1400. Furthermore, the mobile operating system AI agent 1410 may be responsible for the final output through which results transmitted by the cloud system 1400 are presented to a user.

The mobile AI agent manager 1420 may manage a list of the AI agents 1431 to 1433 installed in the user terminal 300. In this case, the mobile AI agent manager 1420 may maintain capability (e.g., a providable function and service) and access rights information of an AI agent, and may provide information on the AI agent to the cloud system 1400.

The cloud AI agent inference service 1440 is a central engine that processes an AI task that is relatively more complicated than an AI task which may be processed in a mobile device level, and may analyze a user instruction transmitted from the user terminal 300 and determine a combination of proper AI agents. Furthermore, the cloud AI agent inference service 1440 may adjust the results of the execution of various AI agents and transmit the results to the user terminal 300 by integrating the results. In this case, the cloud AI agent inference service 1440 may request a list of AI agents 1431 to 1433 installed in the user terminal 300 from the mobile AI agent manager 1420, and may determine a combination of proper AI agents based on the list provided by the mobile AI agent manager 1420 and the external AI agents 1461 to 1463 of the cloud system 1400.

The AI agent execution engine 1450 may execute the external AI agents 1461 to 1463 included in the cloud system 1400 and the AI agents 1431 to 1433 installed in the user terminal 300 (if necessary). In this case, the AI agent execution engine 1450 may manage task distribution and parallel processing, and may transmit the results of the execution to the cloud AI agent inference service 1440 by collecting the results.

The installed AI agents 1431 to 1433 may refer to AI functions of apps installed in a mobile device, such as the user terminal 300, and may process AI tasks which may be executed locally.

The external AI agents 1461 to 1463 may refer to additional AI services which are accessible to the cloud system 1400, and may each provide a specialized AI function or a large-scaled model-based service.

Figure 15:
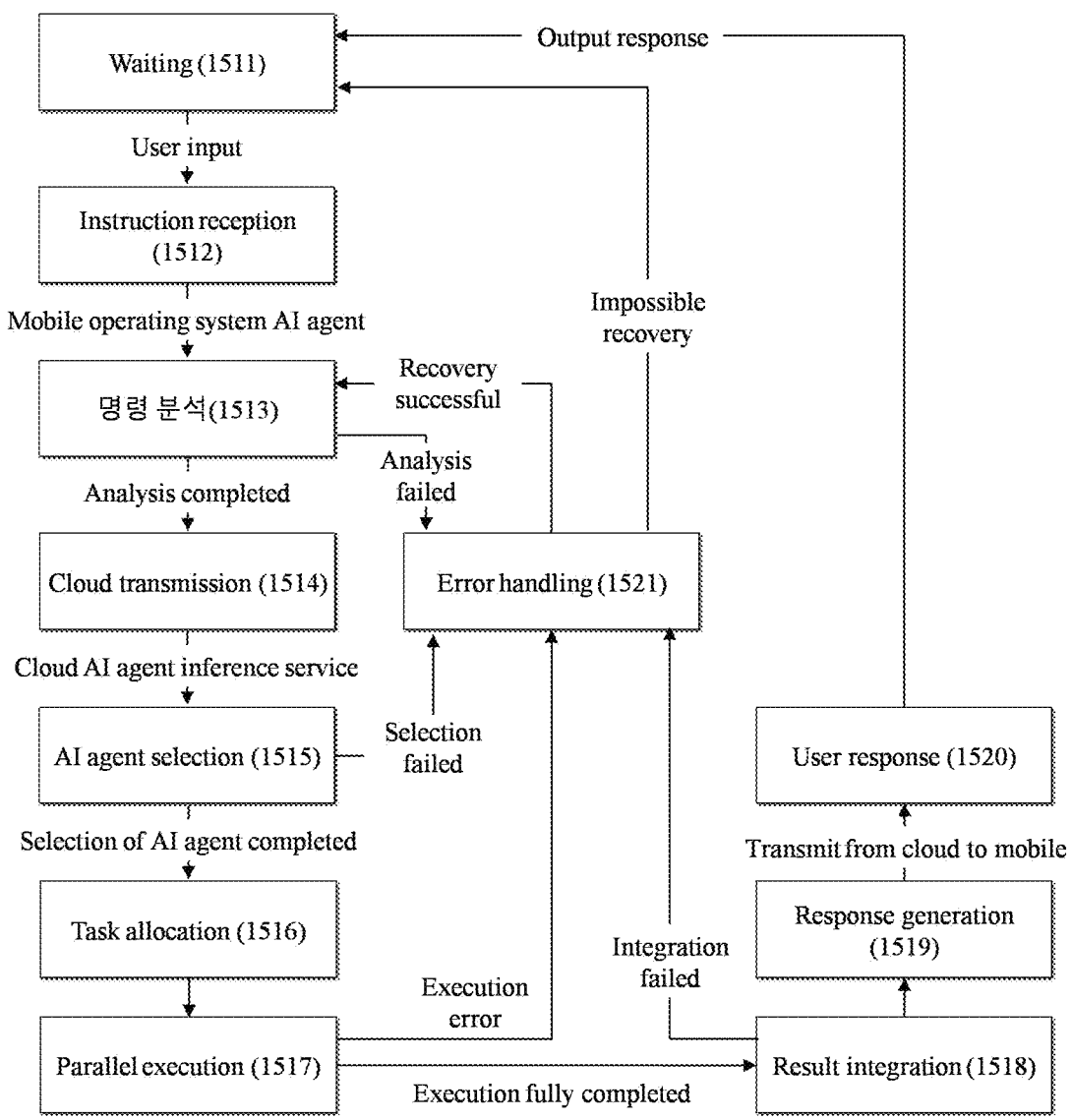
FIG. 15 is a diagram illustrating a state diagram of the AI agent system based on the cloud in an embodiment of the present disclosure.

FIG. 15 is a diagram illustrating a state diagram of an AI agent system based on the cloud in an embodiment of the present disclosure.

A waiting state 1511 may refer to an initial state in which the user terminal 300 of an AI agent system based on the cloud waist for a user input.

A instruction reception state 1512 may refer to a state in which the user terminal 300 of the AI agent system based on the cloud has received a voice or text instruction from a user.

A instruction analysis state 1513 may refer to a state in which the mobile operating system AI agent 1410 analyzes the received instruction.

A cloud transmission state 1514 may refer to a state in which the analyzed instruction is transmitted to the cloud AI inference service 1440.

An AI agent selection state 1515 may refer to a complex state in which the cloud system 1400 selects a proper AI agent. For example, the cloud AI inference service 1440 of the cloud system 1400 may identify AI agents (e.g., the installed AI agents 1431 to 1433) installed in the user terminal 300. Furthermore, the cloud AI inference service 1440 may identify external AI agents (e.g., the external AI agents 1461 to 1463) that are available in the cloud system 1400. Thereafter, the cloud AI inference service 1440 may determine a combination of optimal AI agents.

A task allocation state 1516 may refer to a state in which tasks are allocated to the selected AI agents. An example in which the cloud AI inference service 1440 allocates a task to the AI agent execution engine 1450 has been described above.

A parallel execution state 1517 may refer to a complex state in which AI agents are executed in parallel in a local (i.e., the user terminal 300) and a cloud (i.e., the cloud system 1400). In this case, an AI agent may be executed in a mobile device (if necessary), and an AI agent may also be executed in the cloud system 1400. Also the results of the execution of AI agents may be collected. For example, as described above, the cloud AI inference service 1440 may collect the results of the execution of AI agents from the AI agent execution engine 1450.

A result integration state 1518 may refer to a state in which the collected results are integrated. For example, the cloud AI inference service 1440 may generate integrated results by integrating the collected results.

A response generation state 1519 may refer to a state in which the final response is generated based on the integrated results. The final response may be generated by the cloud AI inference service 1440 and transmitted to the mobile operating system AI agent 1410, and may be generated by the mobile operating system AI agent 1410 that receives the integrated results.

A user response state 1520 may refer to a state in which the generated response is presented to the user. After the response is output, the user response state 1520 may be changed into the waiting state 1511 again.

An error handling state 1521 may refer to a complex state in which an error which may occur in each state is processed. In the error handling state 1521, an error may be detected, the type of detected error may be classified, and an error recovery may be attempted. For example, in the error handling state 1521, an error, such as an analysis failure in the instruction analysis state 1513, a selection failure in the AI agent selection state 1515, an execution error in the parallel execution state 1517, or an integration failure in the result integration state 1519, may be identified, classified, and recovered. The error handling state 1521 may be changed into the instruction analysis state 1513 when recovery is successful, and may be changed into the waiting state 1511 when recovery fails.

Figure 16:
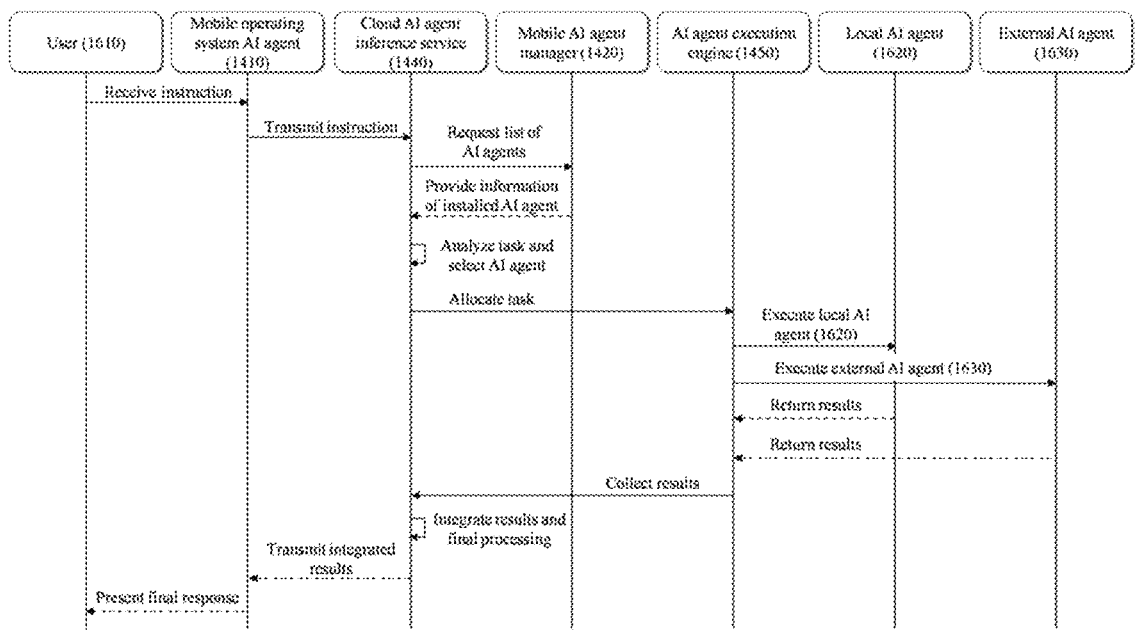
FIG. 16 is a diagram illustrating an example of an operational process of the AI agent system based on the cloud in an embodiment of the present disclosure.

FIG. 16 is a diagram illustrating an example of an operational process of an AI agent system based on the cloud in an embodiment of the present disclosure.

When a user 610 inputs an instruction to the user terminal 300, the instruction may be transmitted to the mobile operating system AI agent 1410. In this case, the mobile operating system AI agent 1410 may transmit the instruction to the cloud AI agent inference service 1440 of the cloud system 1400.

The cloud AI agent inference service 1440 may request a list of AI agents from the mobile AI agent manager 1420 of the user terminal 300. The mobile AI agent manager 1420 may provide the cloud AI agent inference service 1440 with information on AI agents installed in the user terminal 300. In this case, the cloud AI agent inference service 1440 may analyze a task based on the received instruction and the information on the AI agents, and may select an AI agent that will process the analyzed task. In this case, a selected AI agent may basically include at least one external AI agent 1630 of the cloud system 1400, and may further include at least one local AI agent 1620 installed in the user terminal 300, if necessary. In the embodiment of FIG. 16, it is assumed that one external AI agent 1630 and one local AI agent 1620 have been selected.

The cloud AI agent inference service 1440 may allocate a task to the AI agent execution engine 1450. The AI agent execution engine 1450 may request the execution of the task from selected AI agents. In the embodiment of FIG. 16, one external AI agent 1630 and one local AI agent 1620 have been selected. The AI agent execution engine 1450 may process the allocated task by executing each of the selected local AI agent 1620 and external AI agent 1630. Furthermore, the local AI agent 1620 and the external AI agent 1630 may each return the results of each task processing. The AI agent execution engine 1450 may transmit the results of the task processing of the local AI agent 1620 and the external AI agent 1630 to the cloud AI agent inference service 1440.

The cloud AI agent inference service 1440 may integrate the results of the execution of the AI agents by collecting the results, may generate integrated results by finally processing the integrated results, and may transmit the generated integrated results to the mobile operating system AI agent 1410. In this case, the mobile operating system AI agent 1410 may present the final response to the user 1610.

Advantages of a method using the AI agent system based on the cloud using multiple AI agents in the cloud environment are listed in Table 4.

TABLE 4

| Techniques | Contents | Advantages |
| --- | --- | --- |
| Hybrid computing architecture | Optimal utilization of a mobile device and cloud resources | a) Overcome the limits of performance and battery of a mobile device by processing a complicated AI task in the cloud<br>b) Minimize response latency by processing a time-sensitive task or a task that needs to access personal information in a local<br>c) Can dynamically distribute tasks by considering battery consumption and data usage |
| Multi- agent cooperation system | Perform a complicated task by combining the functions of various AI agents | a) Overcome the limits of a single AI model and combine various types of expertise<br>b) Facilitate the addition of a new AI service and the update of the existing service<br>c) Improve an overall processing speed through the parallel processing of tasks |
| Processing of context recognition instruction | Intelligent interpretation of an instruction by considering a user situation, a device environment, and previous dialogue context | a) Provide more accurate and personalized AI response<br>b) Improve understanding of an ambiguous instruction<br>c) Support a natural interaction in a flow of continuous dialogues |
| Management of dynamic AI model | Dynamically load and unload an AI model, if necessary | a) Efficient use of the limited resources of a mobile device<br>b) An improve response speed by the pre-emptive loading of an AI model according to a use pattern<br>c) Smooth support of the integration and update of a new AI model |
| Distributed security architecture | Combine end-to-end encryption and local data processing | a) Reinforce privacy through the local processing of sensitive personal information<br>b) Minimize a data leakage risk through the encryption of cloud transmission data<br>c) Balance personal information protection and data utilization by applying differential privacy |

TABLE 4-continued

| Techniques | Contents | Advantages |
| --- | --- | --- |
| Adaptive user interface | Interface that dynamically represents an AI processing process and results | a) Intuitively present a progress situation of a complicated AI task to a user<br>b) Optimize an interface into which user feedback is incorporated in real time<br>c) Improve accessibility by the support of various output methods (voice, text, and visualization) |
| Scalable plug-in architecture | Can add a new AI agent in a plug-in form | a) Easy scalability of a consistent function of a system<br>b) Support of the integration of innovative AI services by a third party developer<br>c) Can construct a customized AI environment according to user needs |
| Intelligent error handling and recovery mechanism | AI-based error detection, classification, and recovery system | a) Improved system stability and reliability<br>b) Improved consistent performance through automatic learning in an error situation<br>c) Minimized reduction of user experience and fast service recovery |
| Efficient management of resources | Scheduling and allocation of resources based on priority of an AI task | a) Optimal utilization of limited mobile resources<br>b) Rapid processing of an important task and efficient management of a background task<br>c) Extension of battery lifespan through power consumption optimization |
| Cross-platform compatibility | Support various mobile OSs and cloud environments | a) Can secure a wide user base<br>b) Provide consistent AI experience between various devices<br>c) Improve development and maintenance efficiency |

Figure 17:
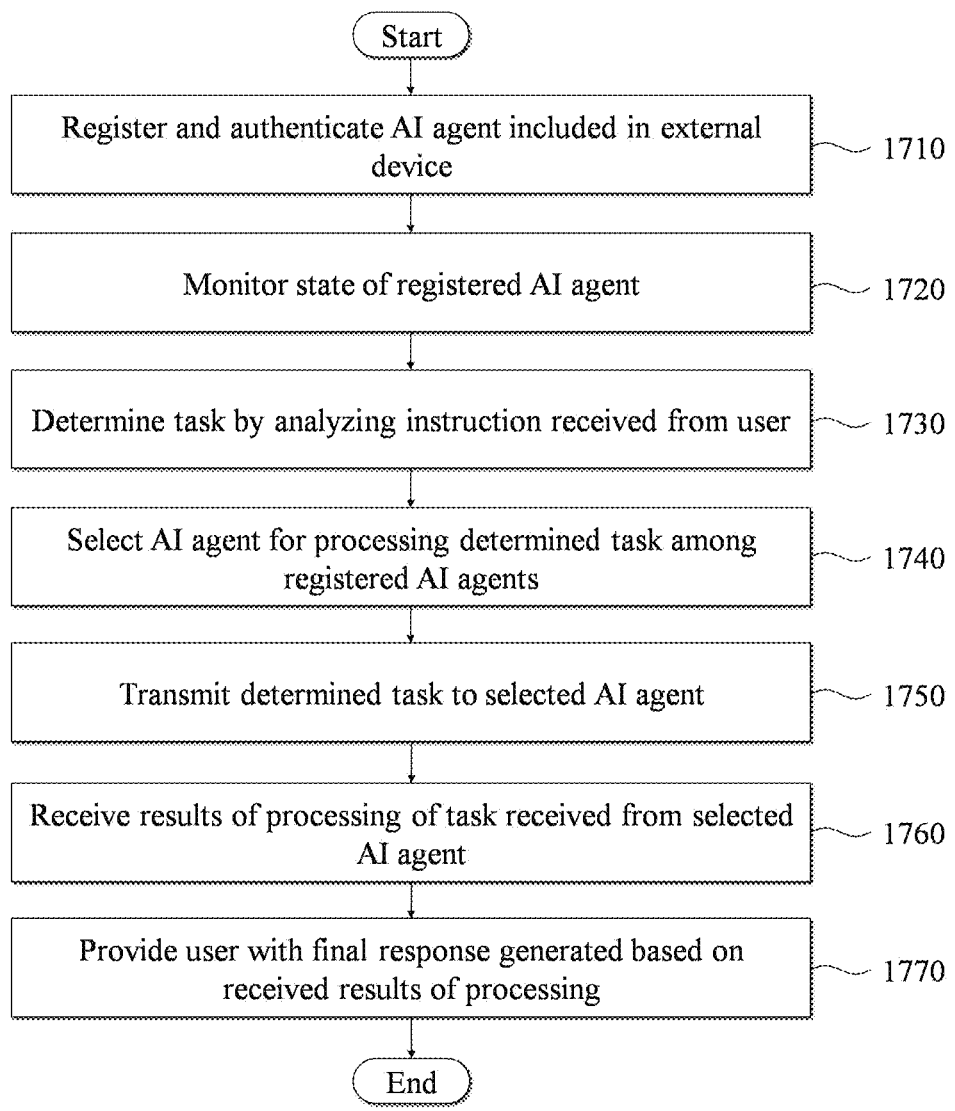
FIG. 17 is a flowchart illustrating an example of an operating method of an MCAHS according to an embodiment of the present disclosure.

FIG. 17 is a flowchart illustrating an example of an operating method of an MCAHS according to an embodiment of the present disclosure. The present embodiment relates to an operating method of the MCAHS for an AI agent that operates in an external device. The operating method may be performed by the computer device 200 that implements the MCAHS like the user terminal 300 of a user. In this case, the processor 220 of the computer device 200 may be implemented to execute a control instruction according to a code of an operating system and/or a code of at least one computer program included in the memory 210. In this case, the processor 220 may control the computer device 200 to perform steps 1710 to 1770 included in the method of FIG. 17 based on the control instruction that is provided by the code stored in the computer device 200. The central control module 410, the registration and authentication module 420, the state monitoring module 430, the task distribution module 440, and the communication protocol module 450 included in the user terminal 300 in order to implement the MCAHS may be functional expressions of the processor 200 for controlling the computer device 200 to perform steps 1710 to 1770.

In step 1710, the computer device 200 may register and authenticate an AI agent included in the external device. For example, the computer device 200 may issue an authentication token by identifying the identity of the AI agent of the external device that requests a connection through an API gateway included in the MCAHS. At this time, the computer device 200 may validate a service by receiving service specifications including detailed information of the service which may be provided by the AI agent of the external device and the authentication token. When the validation of the service is completed, the computer device 200 may register and authenticate the AI agent of the external device by registering the service with a service catalog. Furthermore, the computer device 200 may set access rights and a security policy for the registered service, and may transmit a registration completion message, including the unique identifier of the service and the access token, to the AI agent of the external device.

In this case, the service specifications may include information on at least one of the name of the service, the unique identifier of the service, the category of the service, a list of functions supported by the service, the description of the functions, the format of an input parameter of the service, the format of a return value of the service, the quality index of the service, rights and an access level required for the service, the version of the service, and the update history of the service.

In step 1720, the computer device 200 may monitor the state of the registered AI agent. The monitored state of the AI agent may include information on the availability and performance of the AI agent and whether the AI agent is abnormal.

In step 1730, the computer device 200 may determine a task by analyzing an instruction received from a user. According to an embodiment, the computer device 200 may determine a plurality of tasks for processing one instruction.

In step 1730, in order to determine the task suitable for the instruction, the computer device 200 may determine the intent of the instruction and a domain and analyze context associated with the instruction. In this case, the computer device 200 may generate a feature vector, based on the determined intent, the determined domain, and information extracted from the determined context, and may predict the type of instruction by inputting the generated feature vector to a pre-trained machine learning model. Furthermore, the computer device 200 may determine the task, based on the results of the analysis of the determined intent, the determined domain, the determined context, and the predicted type. In this case, the computer device 200 may calculate a confidence score of the synthesized results, may compare the confidence score with a preset threshold, and may request the check of the determined task from the user when the confidence score is less than the threshold.

In step 1740, the computer device 200 may select an AI agent for processing the determined task, among the registered AI agents. According to an embodiment, the computer device 200 may select the AI agent for processing the determined task based on the monitored state of the AI agent. When the plurality of tasks is determined in step 1730, the computer device 200 may select a plurality of AI agents for processing a plurality of tasks. According to an embodiment, one AI agent may process two or more tasks. In other words, the number of tasks and the number of selected AI agents may be different. Furthermore, the computer device 200 may select the AI agent for processing the determined task based on the state of the AI agent that is monitored in step 1720.

In step 1750, the computer device 200 may transmit the determined task to the selected AI agent. When a plurality of AI agents is selected, the computer device 200 may transmit an allocated task to each of the plurality of selected AI agents. In this case, as already described above, the computer device 200 may transmit context related to the processing of the task, along with the task, by collecting the context.

In step 1760, the computer device 200 may receive the results of the processing of the task received from the selected AI agent. If a plurality of AI agents is selected, the computer device 200 may receive processing results from each of the plurality of AI agents. In other words, the computer device 200 may receive a plurality of processing results.

In step 1770, the computer device 200 may provide the user with a final response generated based on the received results of the processing. When receiving a plurality of processing results, the computer device 200 may generate a final response based on integrated results of the plurality of processing results and provide the generated final response to the user.

According to an embodiment, in step 1740, the computer device 200 may select a plurality of AI agents for the processing of the same task. In this case, in step 1760, the computer device 200 may receive a plurality of processing results from the plurality of AI agents. In step 1770, the computer device 200 may select one processing result, among the plurality of processing results, may generate a final response based on the selected processing result, and may provide the final response to the user. For example, the computer device 200 may select a processing result having a fast response speed and also high accuracy, among the plurality of received processing results.

In step 1740, in order to select an AI agent, the computer device 200 may generate a list of AI agents corresponding to the service area of the task and align the list of AI agents based on preset priority. Thereafter, the computer device 200 may select a preset number of AI agents from the highest priority of the list. In this case, the preset priority may include static priority and dynamic priority. In this case, the static priority may include at least one of basic priority that is set based on user preference and priority according to a service quality index. The dynamic priority may include at least one of priority based on the results of real-time performance monitoring, priority based on the analysis of the recent use pattern of the user for an AI agent, and adaptive priority that is set based on context.

As already described above, the computer device 200 according to the present embodiment may include the mobile device of a user, such as the user terminal 300. In this case, steps 1710 to 1770 included in the operating method of FIG. 17 may be performed by the processor 220 under the control of the AI agent that is provided by an operating platform supplier of a mobile device. The processor 220 may be implemented with two or more processors.

Figure 18:
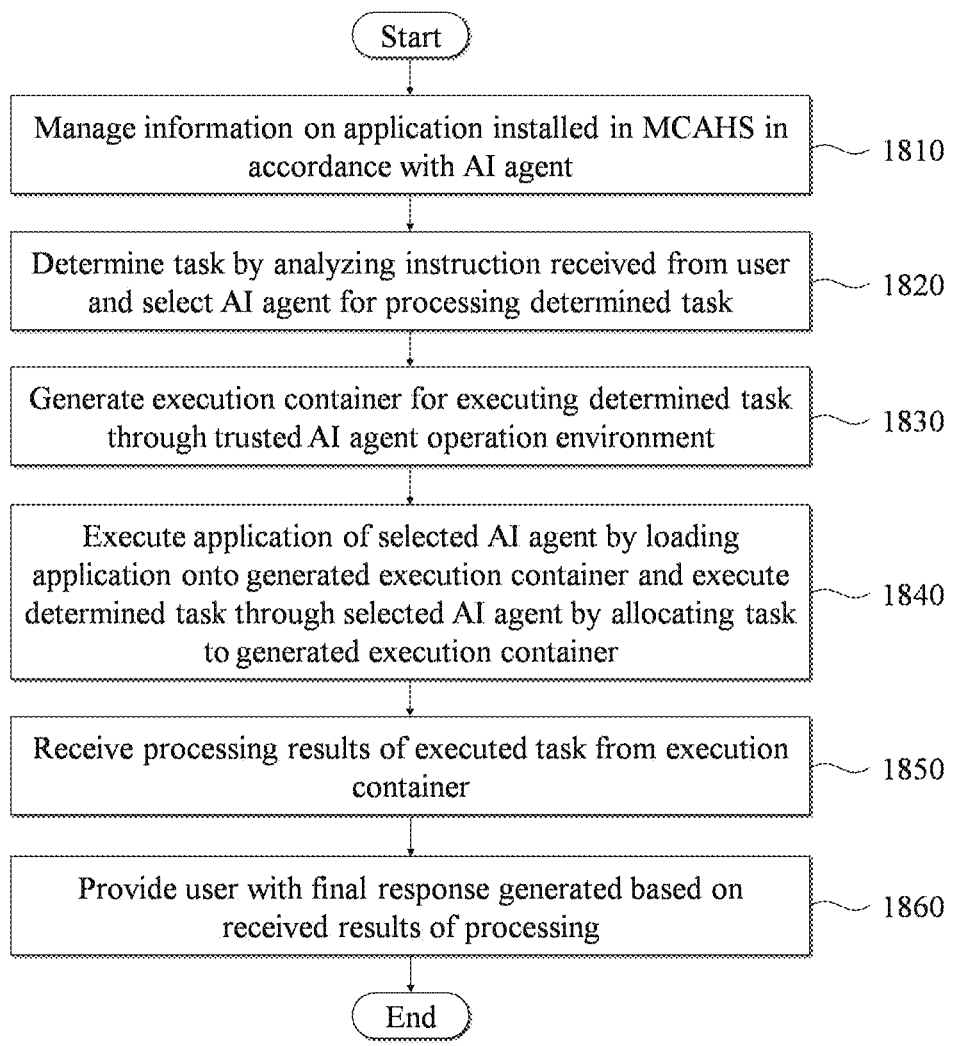
FIG. 18 is a flowchart illustrating another example of an operating method of an MCAHS according to an embodiment of the present disclosure.

FIG. 18 is a flowchart illustrating another example of an operating method of an MCAHS according to an embodiment of the present disclosure. The present embodiment relates to the operating method of the MCAHS including a safe execution environment. The operating method may be performed by the computer device 200 that implements the MCAHS like the user terminal 300 of a user. In this case, the processor 220 of the computer device 200 may be implemented to execute a control instruction according to a code of an operating system and/or a code of at least one computer program included in the memory 210. In this case, the processor 220 may control the computer device 200 to perform steps 1810 to 1860 included in the method of FIG. 18 based on the control instruction that is provided by the code stored in the computer device 200. The central AI agent 1100, the central voice recognition module 1110, the instruction analysis engine 1120, the AI agent manager 1130, the task allocation module 1140, the result integration interface 1150, the security and authority management module 1160, and the app store manage module 1102, among the components included in the operating system 320 of FIG. 11, in order to implement the MCAHS may be functional expressions of the processor 200 for controlling the computer device 200 to perform steps 1810 to 1860. The processor 220 may be implemented with two or more processors.

In the present embodiment, the computer device 200 may include a trusted AI agent operation environment (e.g., the trusted AI agent operation environment 1170 of FIG. 11) in an operating system. Furthermore, the computer device 200 may include the mobile device of a user. In this case, the operating method of the MCAHS according to the present embodiment may be performed by the processor 220 under the control of an AI agent that is provided by an operating platform supplier of the mobile device. In this case, the AI agent that is provided by the operating platform supplier of the mobile device and an AI agent that is subsequently used for the processing of a task may be different from each other.

In step 1810, the computer device 200 may manage information on an application installed in the MCAHS in accordance with an AI agent. For example, the computer device 200 may synchronize an installed application and information on an AI agent corresponding to the installed application with an app store (e.g., the app store 1190 in FIG. 11).

In step 1820, the computer device 200 may determine a task by analyzing an instruction received from a user and select an AI agent for processing the determined task. For example, the computer device 200 may select the AI agent for processing the determined task by considering a least one of a function or service executable by the AI agent, the past use pattern of the user for the AI agent, preference of the user, whether to operate in conjunction with a payment system into which a task that requires payment has been incorporated, information on the location of the user, and advertising association possibility. According to an embodiment, the computer device 200 may determine a plurality of tasks for processing the instruction and select a plurality of AI agents for processing the plurality of tasks. Even in this case, each of the AI agents may be selected according to the aforementioned criteria.

In step 1830, the computer device 200 may generate an execution container for executing the determined task through a trusted AI agent operation environment. The trusted AI agent operation environment may include a resource monitoring module (e.g., the resource monitoring module 1171 described with reference to FIG. 11) that monitors and limits the resource use of the AI agent and an execution policy management module (e.g., the execution policy management module 1172 described with reference to FIG. 11) that manages a policy to control the behavior and access rights of the AI agent. In this case, in the trusted AI agent operation environment, the execution container for executing the AI agent in an isolated environment may be generated.

If a plurality of tasks is determined and a plurality of AI agents for processing the plurality of tasks is selected, the computer device 200 may generate a plurality of execution containers for the plurality of AI agents.

In step 1840, the computer device 200 may execute an application of the selected AI agent by loading the application onto the generated execution container, and may execute the determined task through the selected AI agent by allocating the task to the generated execution container. If a plurality of execution containers is generated, the computer device 200 may process a corresponding task through the application of the AI agent loaded onto a corresponding execution container by transmitting the corresponding task, among the plurality of tasks, to each of the plurality of execution containers.

In step 1850, the computer device 200 may receive the processing results of the executed task from the execution container. If a plurality of tasks is determined with respect to the instruction and a plurality of AI agents is used, the computer device 200 may receive a plurality of processing results from a plurality of execution containers.

In step 1860, the computer device 200 may provide the user with a final response generated based on the received results of the processing. If a plurality of tasks is determined with respect to the instruction and a plurality of AI agents is used, the computer device 200 may generate a final response based on integrated results of a plurality of processing results and provide the final response to the user.

Figure 19:
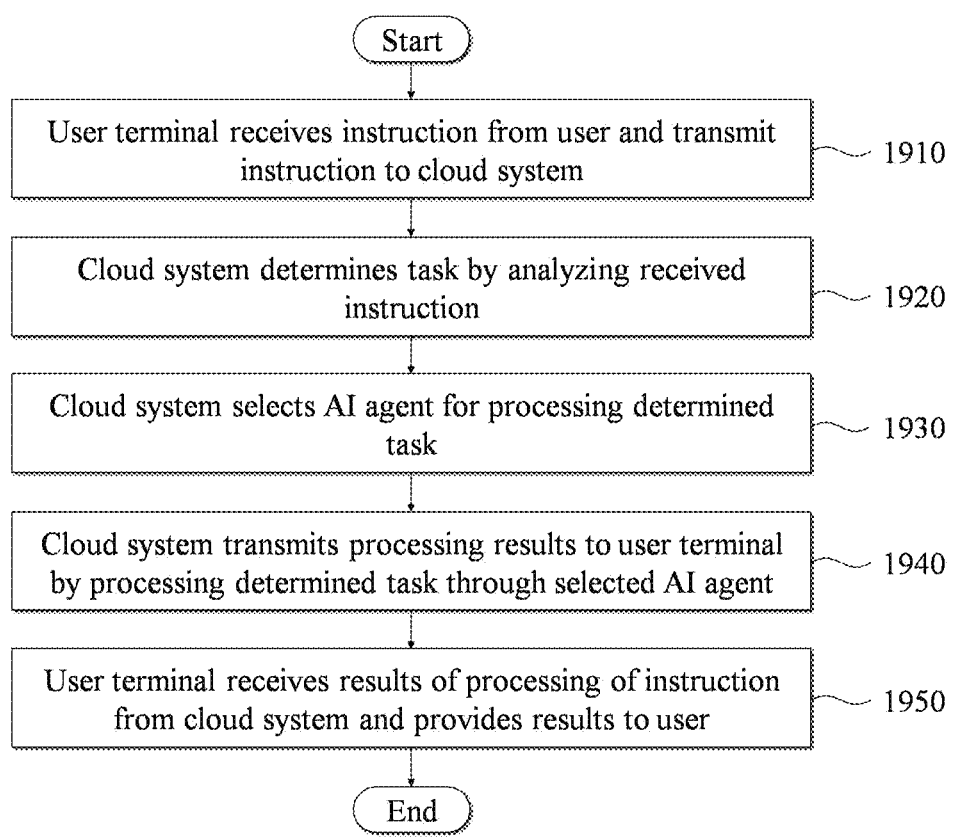
FIG. 19 is a flowchart illustrating an example of an operating method of an AI agent system based on the cloud according to an embodiment of the present disclosure.

FIG. 19 is a flowchart illustrating an example of an operating method of an AI agent system based on the cloud according to an embodiment of the present disclosure. The operating method according to the present embodiment may be performed by the AI agent system based on the cloud. In this case, the AI agent system based on the cloud may include a user terminal (e.g., the user terminal 300) and a cloud system (e.g., the cloud system 1400).

In step 1910, the user terminal may receive an instruction from a user and transmit the instruction to the cloud system. The user terminal may include a mobile operating system AI agent (e.g., the mobile operating system AI agent 1410) that is provided by a mobile operating system platform supplier. The mobile operating system AI agent may control the user terminal to receive the instruction of the user and to transmit the instruction to the cloud system.

In step 1920, the cloud system may determine a task by analyzing the received instruction. A process of determining a task for the instruction has been described in detail through the various embodiments.

In step 1930, the cloud system may select an AI agent for processing the determined task. In this case, the cloud system may select an AI agent for processing the determined task, among AI agents including AI agents installed in the user terminal and AI agents included in the cloud system. In this case, the cloud system may select an AI agent installed in the user terminal or an AI agent included in the cloud system by considering the complexity of the determined task. As already described above, the cloud system may use an AI agent having relatively high performance because the cloud system can use high computing power compared to the user terminal, that is, a mobile device. Accordingly, if an AI agent having high performance is required because the complexity of the task is high, the cloud system may select an AI agent included in the cloud system. If the limit of computing power is small because the complexity of the task is low, the cloud system may select an AI agent installed in the user terminal so that the task is processed in a local (i.e., the user terminal).

The user terminal may include a mobile AI agent manager that manages a list of AI agents installed in the user terminal. In this case, the cloud system may identify the AI agents installed in the user terminal by obtaining the list from the mobile AI agent manager. Furthermore, according to an embodiment, the selected AI agent may include at least one AI agent selected among the AI agents installed in the user terminal and at least one AI agent selected among the AI agents included in the cloud system.

For example, the cloud system may include a cloud AI agent inference service that determines a task by analyzing the received instruction and that selects an AI agent for processing the determined task, and an AI agent execution engine that allocates the determined task to the selected AI agent and that transmits processing results to the cloud AI agent inference service by processing the determined task through the selected AI agent. In this case, the cloud AI agent inference service may obtain the list from the mobile AI agent manager of the user terminal, may identify the AI agents installed in the user terminal based on the obtained list, and may use the AI agents to select an AI agent for the processing of the task.

In step 1940, the cloud system may transmit processing results to the user terminal by processing the determined task through the selected AI agent. In this case, if the selected AI agent is an AI agent installed in the user terminal, the cloud system may control the user terminal so that the AI agent installed in the user terminal processes the determined task in association with the user terminal.

In step 1950, the user terminal may receive the results of the processing of the instruction from the cloud system and provide the results to the user. For example, the mobile operating system AI agent may receive the results of the processing of the instruction from the cloud system and control the user terminal to provide the results to the user.

As described above, the embodiments of the present disclosure can provide the MCAHS for an AI agent that operates in an external device and the operating method thereof. Furthermore, the embodiments of the present disclosure can provide the MCAHS for an AI agent that operates in the user terminal and the operating method thereof. Furthermore, the embodiments of the present disclosure can provide the AI agent system based on the cloud using multiple AI agents in a cloud environment and the operating method thereof.

The aforementioned system or device may be implemented with a hardware component or a combination of a hardware component and a software component. For example, the device and component described in the embodiments may be implemented with using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processing device may perform an operating system (OS) and one or more software applications that are executed on the OS. Furthermore, the processing device may access, store, manipulate, process, and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them, and may configure a processing device so that the processing device operates as desired or may instruct the processing devices independently or collectively. The software and/or the data may be embodied in any type of machine, component, physical device, virtual machine, or computer storage medium or device, or a transmitted signal wave permanently or temporarily, in order to be interpreted by the processing device or to provide an instruction or data to the processing device. The software may be distributed to computer systems that are connected over a network, and may be stored or executed in a distributed manner. The software and the data may be stored in one or more computer-readable recording media.

The method according to an embodiment may be implemented in the form of a program instruction executable by various computer means, and may be stored in a computer-readable medium. The computer-readable recording medium may include a program instruction, a data file, and a data structure alone or in combination. The medium may continue to store a computer-executable program, or may temporarily store the computer-executable program for execution or download. The medium may be various recording means or storage means having a form in which a single piece of hardware or several pieces of hardware have been combined, and is not limited to a medium that is directly connected to any computer system and may be present by being distributed on a network. Examples of the medium may be magnetic media such as a hard disk, a floppy disk, and a magnetic tape, optical media such as CD-ROM and a DVD, magneto-optical media such as a floptical disk, and may be constructed to store computer instructions, such as, ROM, RAM, and flash memory. Furthermore, examples of another medium may include an app store in which apps are distributed, a site in which other various pieces of software are supplied or distributed, and recording media and/or storage media that are managed in a server. Examples of the program instruction include a high-level language code executable by a computer by using an interpreter in addition to a machine-language code, such as that written by a compiler.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned components, such as a system, a structure, a device, and a circuit, are coupled or combined in a form different from that of the described method or replaced or substituted with other components or equivalents thereof.

Accordingly, other implementations, other embodiments, and the equivalents of the claims fall within the scope of the claims.

The embodiments of the disclosure in which an exclusive property or privilege is claimed are defined as follows:

1. An operating method of a mobile-centric agent hub system (MCAHS) implemented with computer device comprising at least one processor, the operating method comprising:
   registering and authenticating, by the at least one processor, AI agents included in an external device;
   determining, by the at least one processor, a task by analyzing an instruction received from a user;
   selecting, by the at least one processor, an AI agent for processing the determined task, among the registered AI agents;
   transmitting, by the at least one processor, the determined task to the selected AI agent;
   receiving, by the at least one processor, results of processing of the transferred task from the selected AI agent; and
   providing, by the at least one processor, a final response generated based on the received results of the processing to the user;
   wherein the registering and authenticating of the AI agent comprises:
      issuing an authentication token by identifying an identity of the AI agent of the external device that requests a connection through an application programming interface (API) gateway included in the MCAHS;
      validating a service that is providable by the AI agent of the external device by receiving service specifications comprising detailed information of the service and the authentication token;
      registering the service with a service catalog when the validation of the service is completed and setting access rights and a security policy for the registered service; and
      transmitting a registration completion message comprising a unique identifier of the service and an access token to the AI agent of the external device,
   wherein the service specifications comprises information on at least one of a name of the service, the unique identifier of the service, a category of the service, a list of functions supported by the service, a description of the functions, a format of an input parameter of the service, a format of a return value of the service, a quality index of the service, rights and an access level required for the service, a version of the service, and an update history of the service.

2. The operating method of claim 1, wherein:
   the determining of the task comprises determining a plurality of tasks for the processing of the instruction,
   the selecting of the AI agent comprises selecting a plurality of AI agents for processing the plurality of tasks,
   the receiving of the results of the processing comprises receiving a plurality of processing results from the plurality of AI agents, and
   the providing of the final response to the user comprises generating the final response based on integrated results of the plurality of processing results and providing the final response to the user.

3. The operating method of claim 1, wherein:
   the selecting of the AI agent comprises selecting a plurality of AI agents for processing the determined task,
   the receiving of the results of the processing comprises receiving a plurality of processing results from the plurality of AI agents, and
   the providing of the final response to the user comprises selecting one of the plurality of processing results, generating a final response based on the selected processing result, and providing the final response to the user.

4. The operating method of claim 1, further comprising monitoring, by the at least one processor, a state of the registered AI agent, wherein the selecting of the AI agent comprises selecting an AI agent for processing the determined task based on the monitored state of the AI agent.

5. The operating method of claim 1, wherein the selecting of the AI agent 6. comprises:
generating a list of AI agents corresponding to a service area of the task;
aligning the list of AI agents based on preset priority; and
selecting a preset number of AI agents from a highest priority of the list, wherein the preset priority comprises static priority and dynamic priority,
the static priority comprises at least one of basic priority that is set based on user preference and priority according to a service quality index, and
the dynamic priority comprises at least one of priority based on results of real-time performance monitoring, priority based on an analysis of a recent use pattern of the user for an AI agent, and adaptive priority that is set based on context.

6. The operating method of claim 1, wherein:
the computer device comprises a mobile device of the user, and
the operating method of the MCAHS is performed by the at least one processor under a control of an AI agent that is provided by an operating platform supplier of the mobile device.

7. The operating method of claim 1, wherein the determining of the task comprises:
determining an intent of the instruction;
determining a domain of the instruction;
analyzing context associated with the instruction;
generating a feature vector based on the determined intent, the determined domain, and information extracted from the determined context;
predicting a type of the instruction by inputting the generated feature vector to a pre-trained machine learning model; and
determining the task based on synthesized results of the determined intent, the determined domain, the determined context, and the predicted type,
wherein the determining of the task based on the synthesized results comprises:
calculating a confidence score of the synthesized results;
comparing the confidence score with a preset threshold; and
requesting the user to check the determined task when the confidence score is less than the threshold.

8. An operating method of a mobile-centric agent hub system (MCAHS) implemented with computer device comprising at least one processor, the operating method comprising:
registering and authenticating, by the at least one processor, AI agents included in an external device;
determining, by the at least one processor, a task by analyzing an instruction received from a user;
selecting, by the at least one processor, an AI agent for processing the determined task, among the registered AI agents;
transmitting, by the at least one processor, the determined task to the selected AI agent;
receiving, by the at least one processor, results of processing of the transferred task from the selected AI agent; and
providing, by the at least one processor, a final response generated based on the received results of the processing to the user;
wherein the selecting of the AI agent comprises:
generating a list of AI agents corresponding to a service area of the task;
aligning the list of AI agents based on preset priority; and
selecting a preset number of AI agents from a highest priority of the list,
wherein the preset priority comprises static priority and dynamic priority, the static priority comprises at least one of basic priority that is set based on user preference and priority according to a service quality index, and the dynamic priority comprises at least one of priority based on results of real-time performance monitoring, priority based on an analysis of a recent use pattern of the user for an AI agent, and adaptive priority that is set based on context.

9. An operating method of a mobile-centric agent hub system (MCAHS) implemented with computer device comprising at least one processor, the operating method comprising:
registering and authenticating, by the at least one processor, AI agents included in an external device;
determining, by the at least one processor, a task by analyzing an instruction received from a user;
selecting, by the at least one processor, an AI agent for processing the determined task, among the registered AI agents;
transmitting, by the at least one processor, the determined task to the selected AI agent;
receiving, by the at least one processor, results of processing of the transferred task from the selected AI agent; and
providing, by the at least one processor, a final response generated based on the received results of the processing to the user;
wherein the determining of the task comprises:
determining an intent of the instruction;
determining a domain of the instruction;
analyzing context associated with the instruction;
generating a feature vector based on the determined intent, the determined domain, and information extracted from the determined context;
predicting a type of the instruction by inputting the generated feature vector to a pre-trained machine learning model; and
determining the task based on synthesized results of the determined intent, the determined domain, the determined context, and the predicted type,
wherein the determining of the task based on the synthesized results comprises:
calculating a confidence score of the synthesized results;
comparing the confidence score with a preset threshold; and
requesting the user to check the determined task when the confidence score is less than the threshold.

* * * * *